(12) United States Patent
Lau et al.

(10) Patent No.: US 12,189,867 B2
(45) Date of Patent: Jan. 7, 2025

(54) METHODS AND SYSTEMS FOR OFFLOADING POSE PROCESSING TO A MOBILE DEVICE FOR MOTION TRACKING ON A HARDWARE DEVICE WITHOUT A CAMERA

(71) Applicant: NEX Team Inc., San Jose, CA (US)

(72) Inventors: Ka Ho Lau, Kwai Chung (HK); On Loy Sung, Lai Chi Kok (HK); Wang Chiu Chan, Tseung Kwan (HK); Wang Fai Ng, Tuen Mun (HK); Keng Fai Lee, Cupertino, CA (US)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 18/602,061

(22) Filed: Mar. 12, 2024

(65) Prior Publication Data
US 2024/0310921 A1    Sep. 19, 2024

Related U.S. Application Data

(60) Provisional application No. 63/452,704, filed on Mar. 17, 2023.

(51) Int. Cl.
*G06F 3/01*    (2006.01)
*G06T 7/73*    (2017.01)

(52) U.S. Cl.
CPC .............. *G06F 3/017* (2013.01); *G06T 7/73* (2017.01); *G06T 2207/10016* (2013.01); *G06T 2207/20084* (2013.01); *G06T 2207/30196* (2013.01)

(58) Field of Classification Search
CPC . G06F 3/017; G06T 7/73; G06T 2207/10016; G06T 2207/20084; G06T 2207/30196
See application file for complete search history.

(56) References Cited

U.S. PATENT DOCUMENTS

| | | | |
|---|---|---|---|
| 7,883,415 B2* | 2/2011 | Larsen | A63F 13/5258 463/36 |
| 9,351,141 B2* | 5/2016 | Jacobsen | H04M 1/05 |
| 9,767,613 B1* | 9/2017 | Bedikian | G06F 1/1684 |
| 10,620,713 B1* | 4/2020 | Ng | G06T 7/73 |
| 10,701,316 B1* | 6/2020 | Cheung | H04N 7/157 |
| 11,527,043 B2* | 12/2022 | Wolfensparger | G09G 5/14 |

(Continued)

*Primary Examiner* — Benyam Ketema
(74) *Attorney, Agent, or Firm* — American Patent Agency PC; Daniar Hussain; Stephen M. Hou

(57) ABSTRACT

Systems and methods for motion tracking on a hardware device without a camera and/or without a sufficiently powerful hardware processor, by offloading pose processing fully or partially to a mobile device, are disclosed. Methods executable on the hardware device include receiving pose data associated with a user from the mobile device, and performing a touchless control of an application on the hardware device, based on the received pose data. Methods executable on the mobile device include capturing at least one image associated with a user, performing a pose recognition algorithm on the mobile device, based on the captured image, to generate pose data for performing a touchless control of an application on the hardware device, and transmitting the pose data to the hardware device, using the network connection. The methods and systems include embodiments where the pose recognition algorithm uses machine learning.

14 Claims, 20 Drawing Sheets

(56) References Cited

U.S. PATENT DOCUMENTS

| | | | |
|---|---|---|---|
| 2006/0239471 A1* | 10/2006 | Mao | H04R 29/005 381/92 |
| 2009/0027337 A1* | 1/2009 | Hildreth | G06F 3/03 345/158 |
| 2009/0073117 A1* | 3/2009 | Tsurumi | G06F 3/0481 345/158 |
| 2009/0217211 A1* | 8/2009 | Hildreth | G06F 3/048 715/863 |
| 2010/0277411 A1* | 11/2010 | Yee | G06F 3/017 382/103 |
| 2011/0107216 A1* | 5/2011 | Bi | G06F 3/0481 715/863 |
| 2011/0302293 A1* | 12/2011 | Buban | G06V 40/20 709/227 |
| 2012/0038549 A1* | 2/2012 | Mandella | G06F 3/011 345/156 |
| 2012/0218183 A1* | 8/2012 | Givon | G06F 3/017 345/157 |
| 2012/0218395 A1* | 8/2012 | Andersen | G06F 3/017 348/E7.085 |
| 2012/0236025 A1* | 9/2012 | Jacobsen | G06F 3/013 345/629 |
| 2013/0106696 A1* | 5/2013 | Ozawa | G06F 3/017 345/158 |
| 2014/0168100 A1* | 6/2014 | Argiro | G06F 3/0346 345/173 |
| 2014/0176436 A1* | 6/2014 | Raffa | G06F 3/0304 345/158 |
| 2014/0201666 A1* | 7/2014 | Bedikian | G06F 3/017 715/771 |
| 2015/0194187 A1* | 7/2015 | Cleven | G06F 3/0482 386/282 |
| 2016/0030835 A1* | 2/2016 | Argiro | A63F 13/23 463/31 |
| 2016/0098095 A1* | 4/2016 | Gonzalez-Banos | A63F 13/92 345/156 |
| 2017/0032538 A1* | 2/2017 | Ernst | G06F 18/2415 |
| 2018/0053056 A1* | 2/2018 | Rabinovich | G06V 40/166 |
| 2022/0203165 A1* | 6/2022 | Lee | G06N 3/08 |

* cited by examiner

ACTIVATION GESTURES        201

✓ BOUNDING BOX
  WITHIN SCREEN
  AND NEAR CENTER

✗ BOUNDING BOX
  NOT WITHIN SCREEN

CURSOR POSITION MOVEMENT

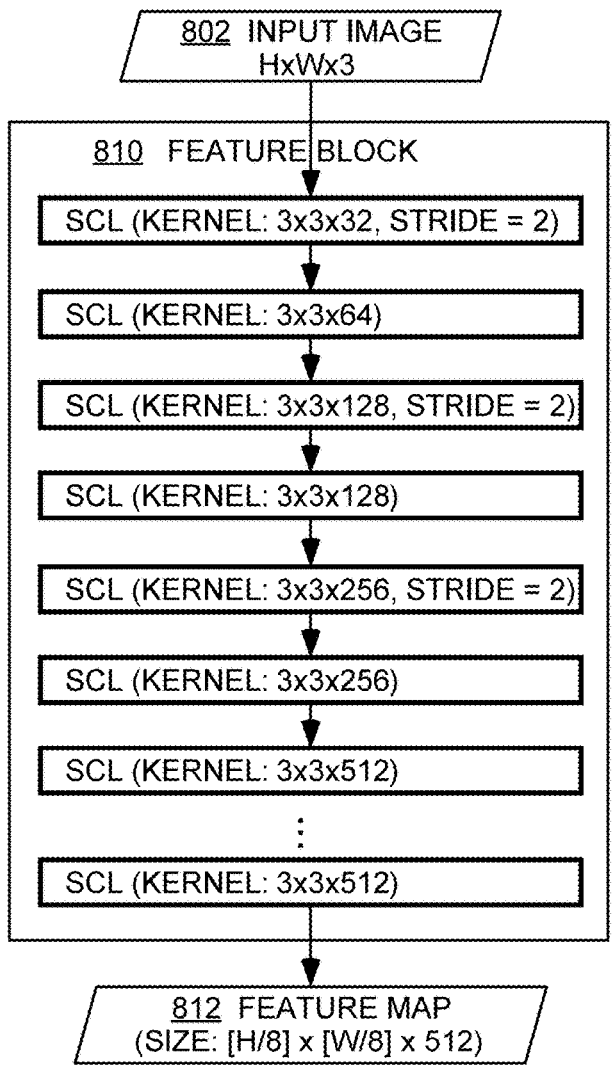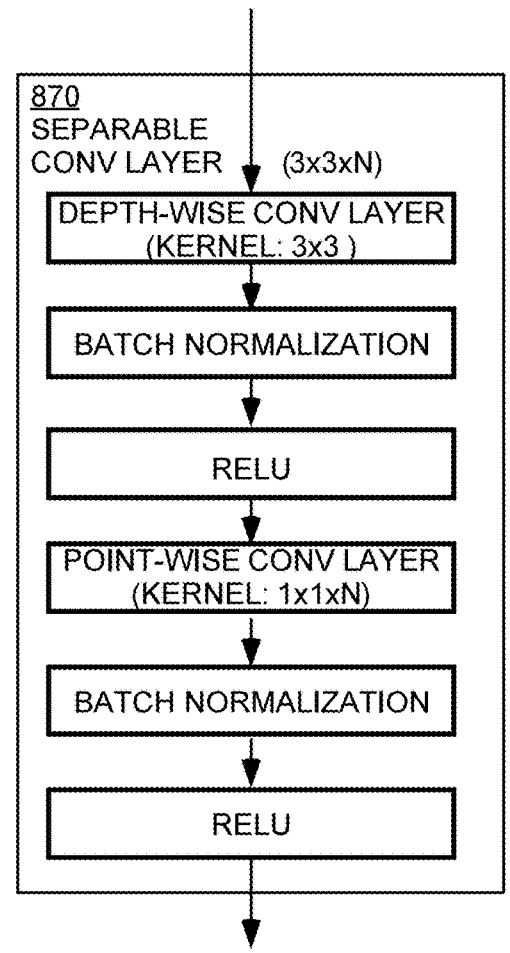
FIG. 8B
FIG. 8C

METHODS AND SYSTEMS FOR OFFLOADING POSE PROCESSING TO A MOBILE DEVICE FOR MOTION TRACKING ON A HARDWARE DEVICE WITHOUT A CAMERA

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of motion tracking on a hardware device without a camera and/or without a sufficiently powerful hardware processor, and pertain particularly to the field of motion entertainment.

BACKGROUND OF THE INVENTION

The statements in the background of the invention are provided to assist with understanding the invention and its applications and uses, and may not constitute prior art.

One of the compulsory conditions for motion entertainment is that entertainment devices such as TVs must come with a camera, either embedded or external. However, most hardware devices such as smart TVs, set-top boxes, projectors, and consoles do not satisfy this condition. The lack of cameras becomes an obstacle for motion entertainment. In addition, this limitation is compounded by the fact that most of the hardware entertainment devices do not come with high computation capabilities (e.g., fast central processing units) and are expected to perform poorly when attempting to carry out operations such as motion tracking and pose recognition.

Furthermore, buying and installing external cameras is onerous and expensive. Similarly, upgrading the processors of existing TVs or consoles is either prohibitively expensive or impossible for consumers. For some hardware devices such as projectors, the use of a front camera close to the projector's light source poses additional technical difficulties, particularly to distinguish and track motion. Furthermore, the projector is inherently located behind the user, not located in front, so even if the projector had a camera, it could not see the front of the user.

On the other hand, smart phones and mobile devices equipped with high-quality cameras and advanced processors, and capable of interfacing with various entertainment devices, are ubiquitous. Therefore, it would be an advancement in the state of the art to harness the vision and processing capabilities of mobile devices to enable motion entertainment using legacy entertainment hardware devices.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

Offloading the pose detection and tracking processes to mobile devices is proposed to enable motion entertainment using legacy entertainment hardware devices without a camera and/or without a sufficiently powerful hardware processor. The methods and systems described herein enable devices such as TVs and set-top boxes to delegate computation to a user's mobile device so that they can be equipped with motion tracking technology.

Various methods and algorithms for offloading pose processing to a mobile device having a camera, for motion tracking on a hardware device without a camera, are within the scope of the present invention. The method can also be applied to hardware devices with a camera but without a sufficiently powerful hardware processor, by offloading pose processing to a mobile device.

In one embodiment, a non-transitory physical storage medium stores program code, which is executable by a hardware processor. When the program code is executed, it causes the hardware processor to execute a computer-implemented process for motion tracking on a hardware device that lacks a camera and/or a sufficiently powerful hardware processor. This process can be executed on a mobile device with a camera by offloading pose processing to the mobile device. The program code includes code to pair the mobile device with the hardware device over a network connection, which is used for transmitting pose data from the mobile device to the hardware device; capture at least one image associated with a user; perform a pose recognition algorithm on the mobile device, based on the captured image, to generate the pose data for performing a touchless control of an application on the hardware device; and transmit the pose data to the hardware device over the network connection.

In another embodiment, the non-transitory physical storage medium described above includes a pose recognition algorithm that utilizes a machine learning module.

In one embodiment, the machine learning module used in the pose recognition algorithm of the non-transitory physical storage medium is selected from the group consisting of a deep learning network (DLN) and a convolutional neural network (CNN).

In another embodiment, the program code to perform the pose recognition algorithm on the non-transitory physical storage medium further comprises program code to apply a convolutional neural network to the image to determine a feature map; determine a keypoints map and an affinity-field map based on the feature map; and determine a pose of the user based on the keypoints map and the affinity-field map.

In one embodiment, the program code to perform the pose recognition algorithm on the non-transitory physical storage medium further includes program code to identify, using an image-recognition technique, an activation gesture of the user in the image; determine a validity of a bounding box associated with the pose of the user; and track, using a pose-estimation technique, the pose of the user and a portion of a body of the user within the bounding box, to generate a tracked pose.

In various embodiments, the pose data on the non-transitory physical storage medium is selected from the group consisting of a feature map, a keypoints map, an affinity-field map, and a tracked pose.

In one embodiment, the non-transitory physical storage medium further includes program code to capture at least one video on the mobile device; and perform a pose recognition algorithm on the mobile device, based on at least one frame of the captured video, to generate the pose data.

In some embodiments, the network connection on the non-transitory physical storage medium uses a technology selected from the group consisting of a local area network (LAN), a wide area network (WAN), a Bluetooth link, a WiFi network, a sensor network, a cellular network, an ad-hoc wireless network, an enterprise network, and a body area network (BAN).

In various embodiments, the pose data on the non-transitory physical storage medium is used by the application on the hardware device to perform an operation in the application.

In another embodiment, a non-transitory physical storage medium stores program code, which is executable by a hardware processor. When the program code is executed, it causes the hardware processor to execute a computer-implemented process for motion tracking on a hardware device that lacks a camera and/or a sufficiently powerful hardware processor by offloading pose processing to a mobile device with a camera. The program code includes code to pair the hardware device with the mobile device over a network connection, which is used for transmitting pose data from the mobile device to the hardware device; receive the pose data associated with a user from the mobile device over the network connection; and perform a touchless control of an application on the hardware device, based on the received pose data.

In one embodiment, the program code to perform the touchless control of the application on the hardware device, based on the received pose data, further comprises program code to determine, based on the received pose data, a mapping between the portion of the user's body and a user interface element (e.g., cursor) position associated with an application executed on the hardware device; and move the user interface element position based on the mapping to enable an interaction between the user and the application.

In various embodiments, the pose data on the non-transitory physical storage medium is selected from the group consisting of a feature map, a keypoints map, an affinity-field map, and a tracked pose.

In some embodiments, the network connection on the non-transitory physical storage medium uses a technology selected from the group consisting of a local area network (LAN), a wide area network (WAN), a Bluetooth link, a WiFi network, a sensor network, a cellular network, an ad-hoc wireless network, an enterprise network, and a body area network (BAN).

In one embodiment, the pose data on the non-transitory physical storage medium is used by the application on the hardware device to perform an operation in the application.

In various embodiments, a motion tracking system comprises a hardware device without a camera and/or without a sufficiently powerful hardware processor; a mobile device with a camera; and a network connection for communicating between the hardware device and the mobile device. At least one non-transitory physical storage medium stores program code, which is executable by at least one hardware processor. When the program code is executed, it causes the at least one hardware processor to execute a computer-implemented process for motion tracking on the hardware device. The process is executable on the mobile device by offloading pose processing to the mobile device. The program code includes code to pair the mobile device with the hardware device over the network connection; capture at least one image associated with a user at the mobile device; perform a pose recognition algorithm on the mobile device, based on the captured image, to generate pose data; transmit the pose data to the hardware device over the network connection; and perform a touchless control of an application on the hardware device, based on the pose data received at the hardware device.

In some embodiments, the pose recognition algorithm in the motion tracking system uses a machine learning module.

In one embodiment, the machine learning module in the motion tracking system's pose recognition algorithm is selected from the group consisting of a deep learning network (DLN) and a convolutional neural network (CNN).

In another embodiment, the program code to perform the pose recognition algorithm in the motion tracking system further comprises program code to apply a convolutional neural network to the image to determine a feature map; determine a keypoints map and an affinity-field map based on the feature map; and determine a pose of the user based on the keypoints map and the affinity-field map.

In some embodiments, the pose data in the motion tracking system is selected from the group consisting of a feature map, a keypoints map, an affinity-field map, and a tracked pose.

In one embodiment, the motion tracking system further comprises program code to capture at least one video on the mobile device; and perform a pose recognition algorithm on the mobile device, based on at least one frame of the captured video, to generate the pose data.

Yet another embodiment is a computer-implemented method for motion tracking on a hardware device that lacks a camera and/or a sufficiently powerful hardware processor. This method can be executed on a mobile device with a camera by offloading pose processing to the mobile device. The method pairing the mobile device with the hardware device over a network connection, which is used for transmitting pose data from the mobile device to the hardware device; capturing at least one image associated with a user; performing a pose recognition algorithm on the mobile device, based on the captured image, to generate the pose data for performing a touchless control of an application on the hardware device; and transmitting the pose data to the hardware device over the network connection.

Yet another embodiment is a computer-implemented method for motion tracking on a hardware device that lacks a camera and/or a sufficiently powerful hardware processor by offloading pose processing to a mobile device with a camera. The method includes pairing the hardware device with the mobile device over a network connection, which is used for transmitting pose data from the mobile device to the hardware device; receiving the pose data associated with a user from the mobile device over the network connection; and performing a touchless control of an application on the hardware device, based on the received pose data.

In various embodiments, a computer program product is disclosed. The computer program may be used for offloading pose processing to a mobile device having a camera, for motion tracking on a hardware device without a camera and/or without a sufficiently powerful hardware processor, and may include a computer-readable storage medium having program instructions, or program code, embodied therewith. The program instructions are executable by a processor to cause the processor to perform the aforementioned steps.

In various embodiments, a system is described, including a memory that stores computer-executable components, and a hardware processor, operably coupled to the memory, and that executes the computer-executable components stored in the memory, wherein the computer-executable components may include components communicatively coupled with the processor that execute the aforementioned steps.

In another embodiment, the present invention is a non-transitory, computer-readable storage medium storing executable instructions, which when executed by a processor, causes the processor to perform a process for offloading pose processing to a mobile device having a camera, for motion tracking on a hardware device without a camera and/or without a sufficiently powerful hardware processor, the instructions causing the processor to perform the aforementioned steps.

In another embodiment, the present invention is a system for offloading pose processing to a mobile device having a camera, for motion tracking on a hardware device without a camera and/or without a sufficiently powerful hardware processor, the system comprising the mobile device with the camera, a processor, a display, a first memory; a server comprising a second memory and a data repository; a telecommunications link between the mobile device and the server; and a plurality of computer codes embodied on the first and second memory of the mobile device and the server, the plurality of computer codes, when executed, causing the server and the mobile device to execute a process comprising the aforementioned steps.

In yet another embodiment, the present invention is a computerized server comprising at least one processor, memory, and a plurality of computer codes embodied on the memory, the plurality of computer codes, when executed, causing the processor to execute a process comprising the aforementioned steps. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which:

FIG. 8B is a detailed block diagram illustrating an exemplary Feature Block, in accordance with example embodiments of the disclosure.

FIG. 8C is a detailed block diagram illustrating an exemplary separable convolutional neural network layer, in accordance with example embodiments of the disclosure.

DETAILED DESCRIPTION OF THE INVENTION

Figure 1A:
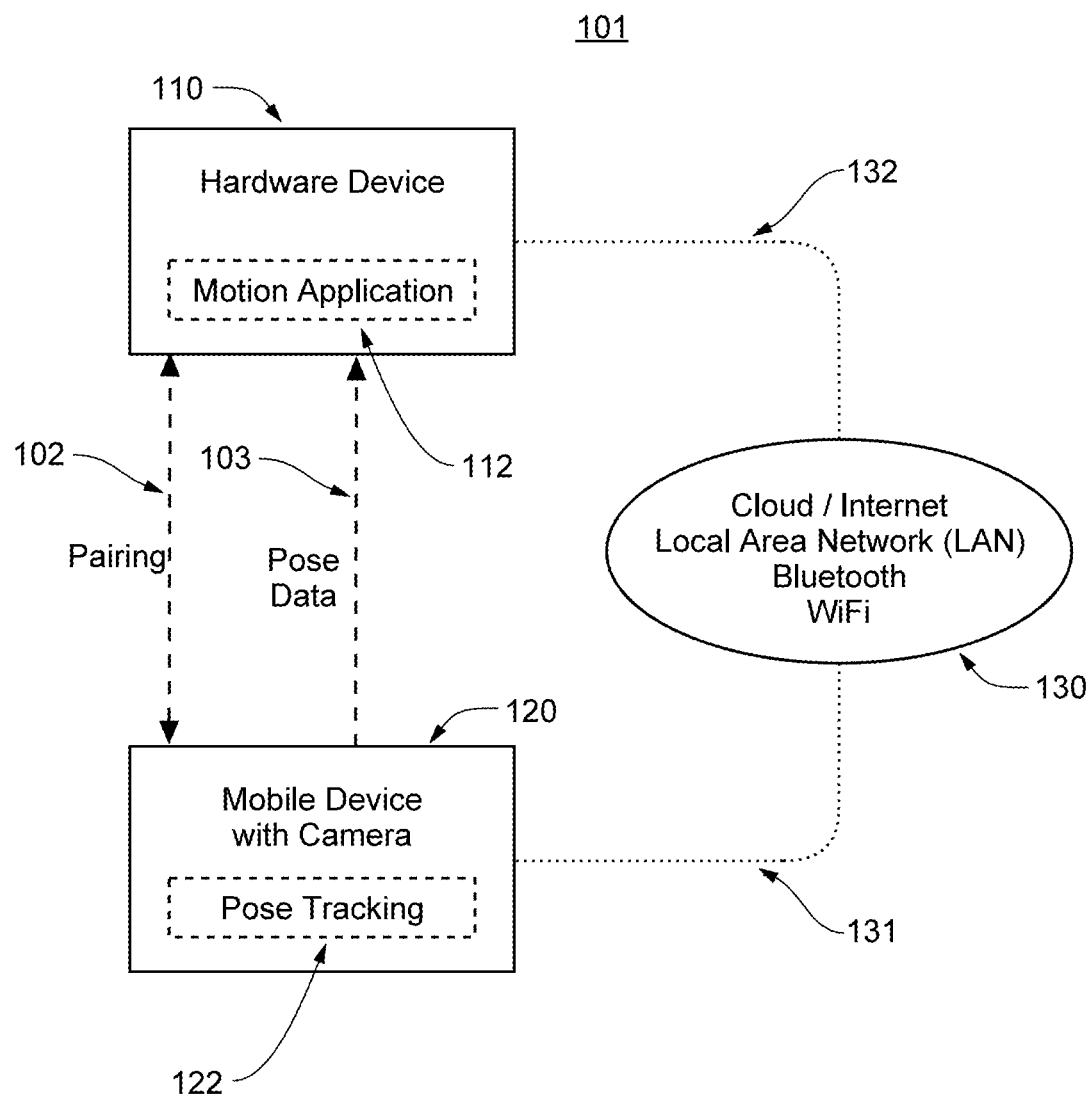
FIG. 1A shows an overview of a system for offloading pose processing to a mobile device for motion tracking on a hardware device without a camera and/or without a sufficiently powerful hardware processor, in accordance with exemplary embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

As used herein, the singular forms "a," "an," and "the" include plural references unless the context clearly indicates otherwise. Thus, for example, reference to "a fiber" includes a single fiber as well as a mixture of two or more different fibers, and the like. Also, as used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number +/−10%, such that "about 10" would include from 9 to 11.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The terms NEX, NEX TEAM, or HOMECOURT may be used in this specification to describe the overall game video capturing and analytics generation platform, as well as the company providing said platform. With reference to the figures, embodiments of the present invention are now described in detail. It would be understood by persons having ordinary skill in the art that the block diagrams, schematics, and flowchart illustrations as presented herein may be implemented in the form of a computer program product, a hardware product, a combination of computer program and hardware product, and/or apparatus, systems, computing devices, and/or the like to execute instructions, operations, process steps as presented.

The terms "mobile device" and "user device" are to be understood generally, and include but are not limited to, for example, computers, computing entities, mobile phones, tablets, phablets, notebooks, laptops, desktop computers, gaming consoles (e.g., Xbox, Play Station, Wii), watches, glasses, televisions, wearable items/devices, kiosks, input terminals, set-top boxes, the like, and/or any combination of devices or entities adapted to perform the functions, operations, and/or processes described herein. In one embodiment, the "mobile device" or "user device" has at least one integrated camera, or at least one external camera, operably connected to a hardware processor, as well as other appropriate hardware, that is adapted to perform the functions, operations, and/or processes described herein.

One of ordinary skill in the art would recognize that "cursor" and "cursor position" are to be understood generally, and not specifically to a literal mouse or trackpad cursor. The term "cursor" is meant to encompass any positional user-controlled graphical element(s) represented on the screen of a user device. For example, the "cursor" can include a pointer at a fixed coordinate on the screen of the user device, and can also include a horizontal position in a scrolling operation over an entire screen of the user device. In various embodiments of the present invention, the user-controlled graphical element on the device screen may take any shape and be any object associated with a software application on a user device. In one embodiment, the user-controlled graphical element may be a virtual avatar representing the user. In one embodiment, the user-controlled graphical element may be a virtual body part of such a virtual avatar. The terms "user interface element," "interface element," "GUI element," and "cursor" may be used interchangeably herein.

Exemplary System Overview

FIG. 1A shows an overview of a system for offloading pose processing to a mobile device for motion tracking on a hardware device without a camera and/or without a sufficiently powerful hardware processor, in accordance with exemplary embodiments of the present invention. The system 101 comprises a hardware device without a camera and/or without a sufficiently powerful hardware processor 110, a mobile device with a camera 120, where the mobile device is connected to the hardware device through a network 130. In the exemplary illustration of FIG. 1, the hardware device 110 is a home entertainment device such as a TV, a set-top box, or a console.

A user seeks to install an application that may benefit from pose detection and tracking on the cameraless hardware device 110 (e.g., motion game client software), shown in FIG. 1 as a motion application 112. In order to experience the full range of features available, the user enables their mobile device 120 to become a pose camera device by installing a pose tracking application 122 on the mobile device 120.

In some embodiments, the hardware 110 and mobile 120 devices may be paired 102. Pairing can occur automatically or through an action by the user. In one embodiment, the motion application 112, once installed, prompts the user to install the pose tracking 122 application on the mobile device 120, and to pair the two devices. In another embodiment, the pose tracking application 122, once installed, prompts the user to pair the mobile device with the hardware device. In yet another embodiment, the pose tracking application 122 automatically detects the hardware device through the network 130, and automatically pairs the mobile device 110 with the hardware device 110.

Any relevant network 130 infrastructure may be used to connect the hardware and mobile devices, including—but not limited to—a local area network (LAN), a Bluetooth link, a WiFi network, a sensor network, a cellular network, an ad-hoc wireless network, an enterprise network, a body area network (BAN), or the Internet (e.g., using a cloud server). Network links from the mobile device to the network 131 and from the network to the hardware device 132 may use different networking technologies and infrastructures.

The mobile device 120 then detects the user's pose from a captured image or video associated with the user. The mobile device 120 may track and stream pose data 103 to the hardware device 110 through the network 130. In some embodiments, the system may use a network infrastructure for streaming pose data that is different from the network infrastructure used for pairing 102 the devices. In other embodiments, any network 130 infrastructure that is able to stream the pose data may be utilized in both the pairing and pose data transmission steps.

To detect the user's pose, the pose tracking application 122 may use a machine vision algorithm employing a machine learning (ML) model such as a deep learning network (DLN), as shown in FIGS. 5-8E. In various embodiments, pose data 103 may comprise a feature map, a keypoints map, an affinity-field map, or a tracked pose, as discussed below.

Owing to the mobile device's camera and processing capabilities, the pose detection and tracking 122 functionality is thus offloaded from the hardware device 110 to the mobile device 120. This allows remote tracking of user movements and gestures, providing the user with a more immersive and interactive experience when using the motion application. The solution described in FIG. 1 enables TVs and set-top boxes to delegate computation associated with pose detection and tracking to the user's mobile device, so that TVs and set-top boxes can be equipped with motion technology.

Most of the conventional existing solutions for equipping a television/set-top-box (TV/STB) with motion technology will equip the TV/STB with a camera and utilize the processing power of the TV/STB for pose estimation. However, this method has limited performance since most TV/STB devices have relatively low processing power compared to mobile devices.

The method and systems described herein enable the offloading of pose estimation to mobile devices. This may represent a large improvement in performance and user experience, as most mobile devices are equipped with specialized hardware acceleration tools such as a Neural Processing Unit (NPU). Unlike graphics processing units (GPUs) or general-purpose central processing units (CPUs), NPUs are specifically designed to accelerate parallel computations involving large amounts of data, which is characteristic of neural network processing and other AI-related tasks. Owing to their specialized hardware acceleration capabilities, mobile devices may exhibit higher processing power than TV/STBs, thus reducing the latency of the pose estimation process and yielding an improved experience for users.

The offloading of pose processing for motion tracking on a hardware device without a camera and/or without a sufficiently powerful hardware processor may have applications beyond home entertainment, such as biomedical technology (e.g., equipment for disabled and injured persons, healthcare devices, telemedicine), telework and telepresence, mission-critical equipment (e.g., first response, search and rescue, and military applications), etc.

Figure 1B:
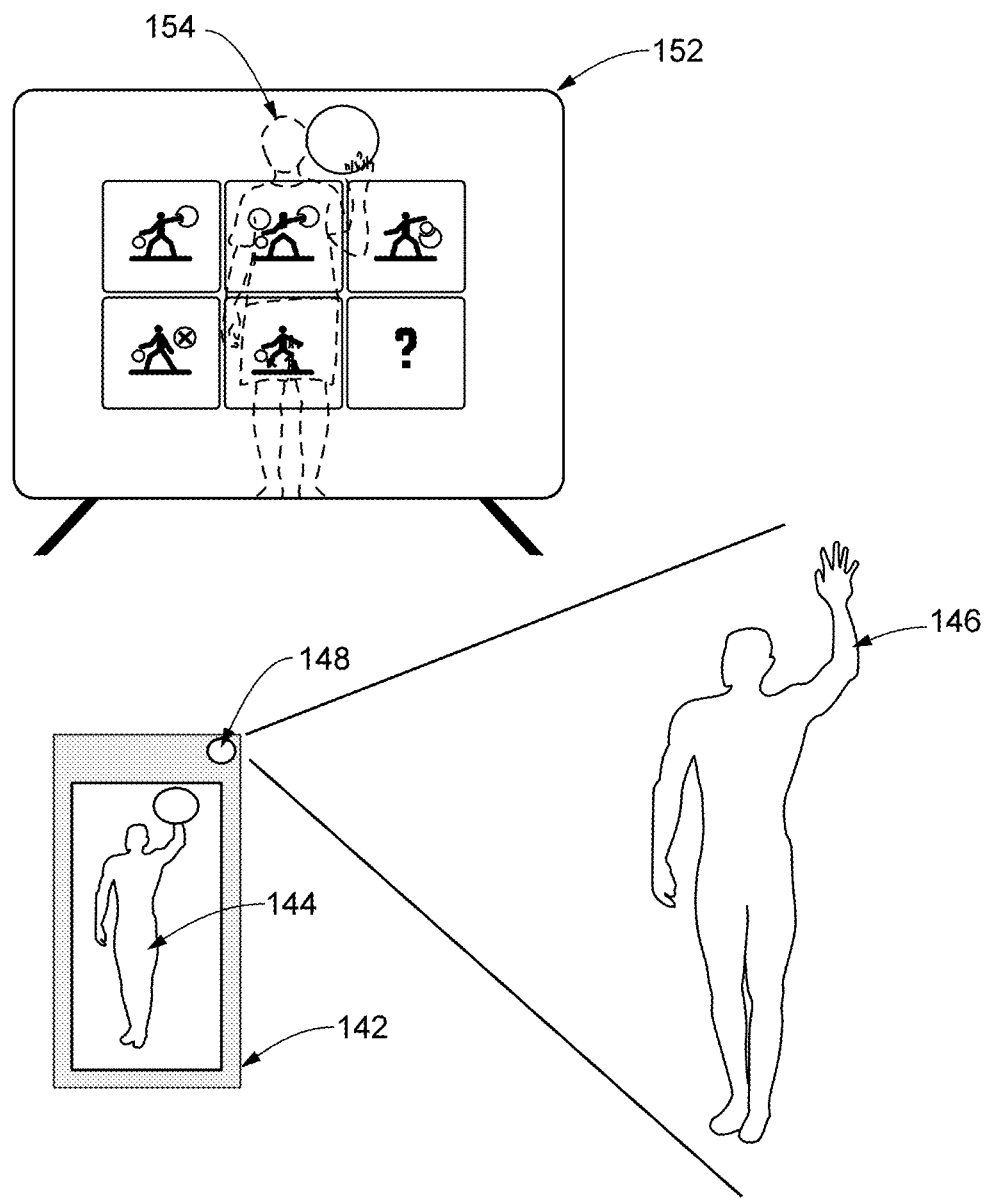
FIG. 1B shows a diagram illustrating a use case of the disclosed systems, in which a user is shown standing in front of a mobile device, and a representation of the user is detected and displayed on a screen of the hardware device, enabling touchless control of the hardware device, in accordance with example embodiments of the disclosure.

FIG. 1B shows a diagram 140 illustrating a use case of the disclosed systems, in accordance with example embodiments of the disclosure. In FIG. 1B, a user 146 is standing in front of a mobile device 142, having at least one camera 148. The user 146 is shown performing touchless control over a hardware device, represented in FIG. 1B by a television (TV) set 152. The disclosed system detects the user's 146 activation gesture (left hand up and above the head for a predetermined period of time), determines a pose of the user 146, and tracks a hand position of the user 146. In one embodiment, a representation of the user 154 is displayed on a screen of the hardware device 152, thus enabling touchless control of an application on the hardware device 152, as described herein. In one embodiment, a representation 144 of the user 146 is displayed on a screen of the mobile device 142. This embedment is useful for hardware devices with limited processing or display capabilities. In some embodiments, screens of both the hardware device 152 and the mobile device 142 display the application to be controlled on the hardware device 152, thus enabling touchless control of the application on the hardware device, as described herein.

Motion Tracking

Figure 2A:
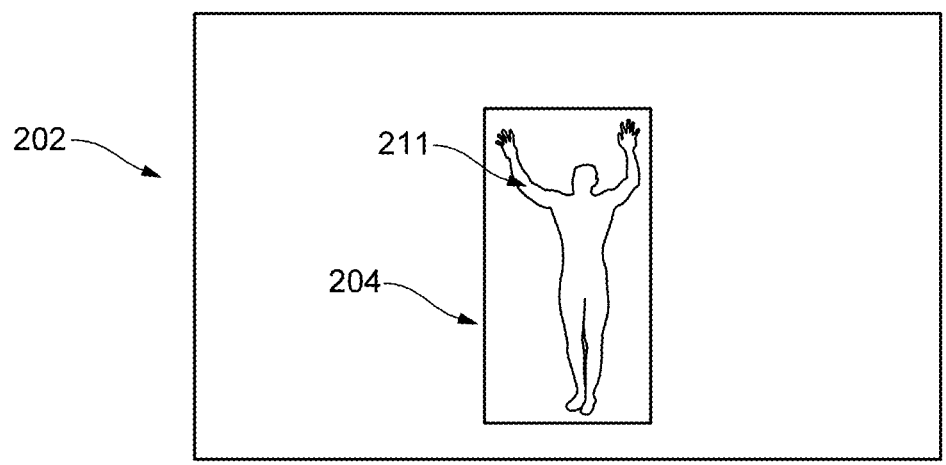
FIG. 2A shows diagrams illustrating a user in different positions with respect to a camera of a user device leading to the disclosed systems generating different bounding boxes for the user, in accordance with example embodiments of the disclosure.
Figure 2A:
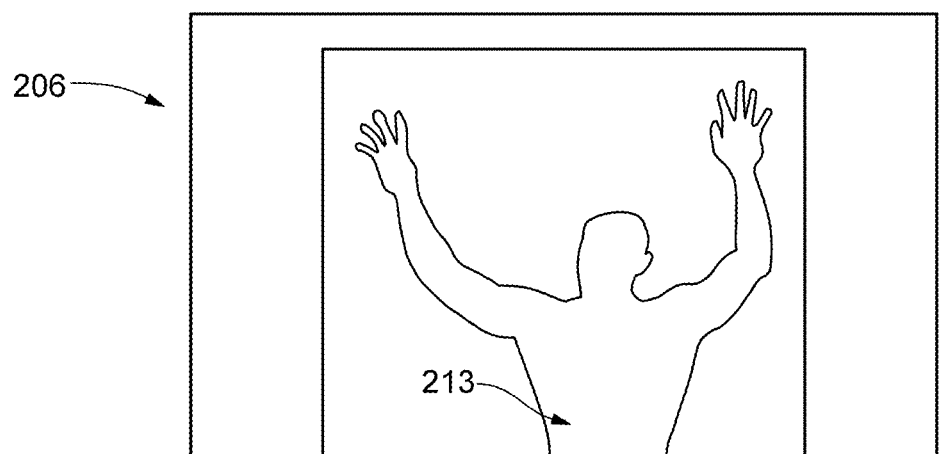

FIG. 2A shows diagrams illustrating a user in different positions with respect to a camera of a user device leading to the disclosed systems generating different bounding boxes for the user, in accordance with example embodiments of the disclosure. In particular, FIG. 2A includes a diagram 201 showing screens 202 and 206 and bounding boxes 204 and 208, to be described. In some examples, an activation of a portion of the user's body can be enabled when the disclosed systems determine that a pose bounding box associated with a user is valid, within threshold dimensions of the screen of the user device, near the center of the screen of the user device (e.g., within a threshold amount from the center of the screen, and within a threshold distance from the user, and so on). In particular, diagram 201 shows a first situation in which a bounding box 204 is within the dimensions of screen 202. Further, the bounding box 204 is relatively near the center of screen 202. In this case, the disclosed systems may be configured to detect activation motions and/or gestures associated with the user 211. In contrast, diagram 201 shows a second situation in which a bounding box 208 is not fully within the dimensions of screen 206 (e.g., bounding box 208 extends past the bottom side of screen 206). This may be due to the fact that the user device (not shown) may be too close to the user 213 and/or at a particular angle with respect to the body of the user that does not necessarily capture the full extent of the user's body. Accordingly, the disclosed systems may be configured to ignore the activation motions and/or gestures associated with the user 213.

Figure 2B:
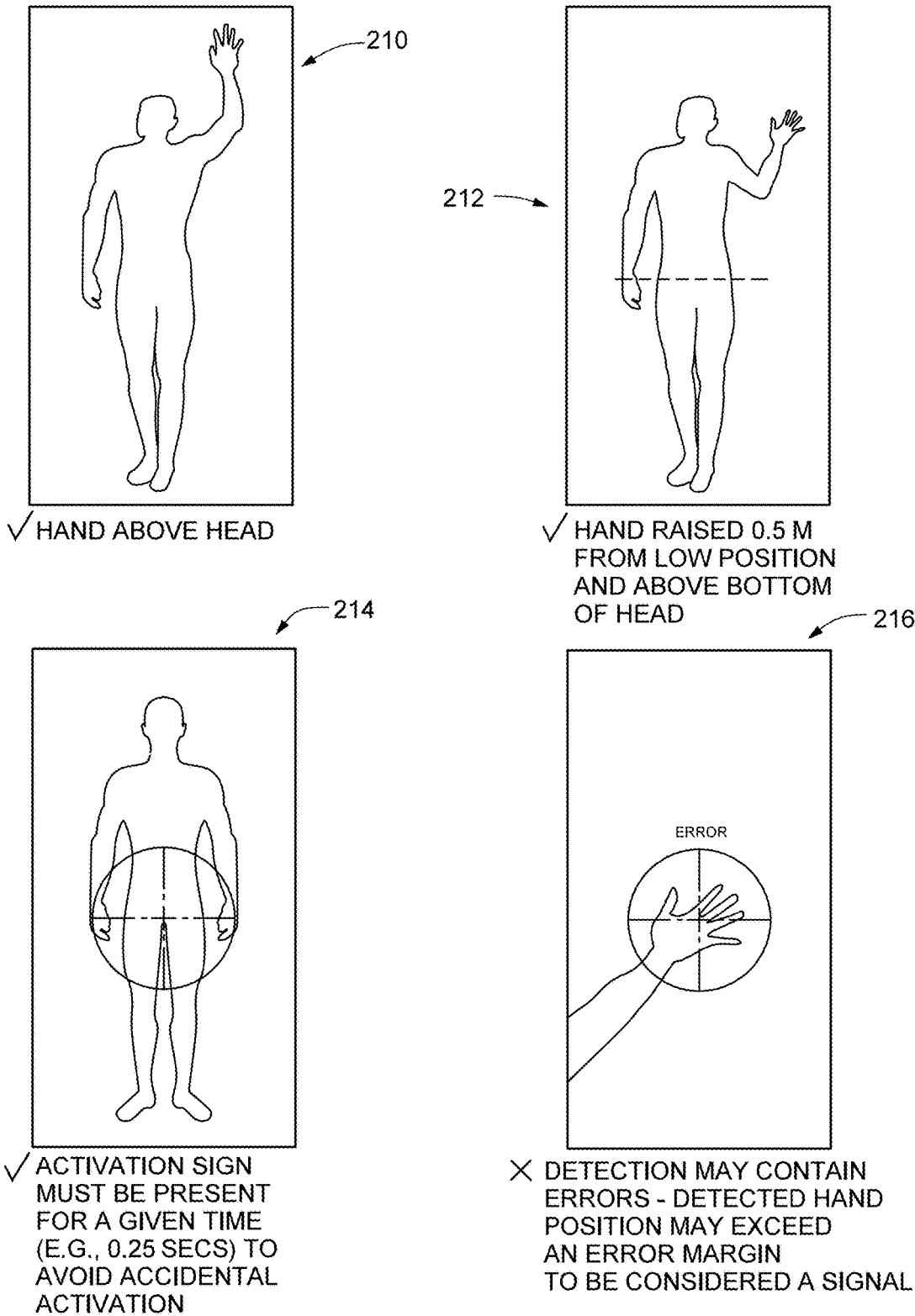
FIG. 2B shows diagrams illustrating a user having different example gestures that may be interpreted differently by the disclosed systems, in accordance with example embodiments of the disclosure.

FIG. 2B shows a diagram 203 illustrating a user having different example gestures that may be interpreted differently by the disclosed systems, in accordance with example embodiments of the disclosure. In some examples, the disclosed systems can include an activation feature whereby a user performs some gestures to activate touchless control with a portion of his or her body (e.g., via his or her hand). In other examples, the disclosed systems can include a tracking feature whereby an activated portion of the user's body (e.g., an activated user's hand) is tracked and is used to perform touchless control. In some aspects, touchless control can include controlling a cursor position. In some aspects, the disclosed systems can map the activated portion of the user's body (e.g., an activated user's hand) to the cursor position. Further, the disclosed systems can apply a mathematical transformation such that smaller hand movements result in more cursor movements. In other examples, the disclosed systems can enable switching a portion of the user's body for another portion (e.g., one hand or the other hand) for implementing touchless control. Moreover, the disclosed systems can enable a deactivation of the touchless control, for example, using a predetermined gesture or set of gestures, using a voice command, and/or the like.

In some examples, the disclosed systems can implement predetermined rules associated with the gestures. For example, the disclosed systems can rank the degree of confidence in recognizing a given gesture as an activation gesture to commence touchless control. For example, as shown in pose 210, the disclosed systems can specify that if a user's first hand is above the user's head, the gesture can be classified as a relatively high strength activation signal. In other examples, the disclosed systems can specify that if the user's hand is above the user's shoulder, the gesture can be classified as an intermediate strength activation signal. Accordingly, the disclosed systems can be configured to wait for a predetermined duration to confirm the signal. The disclosed systems can further specify that if the user's hand is above the user's center of the chest, the gesture can be classified as a weaker activation signal, and accordingly, the disclosed systems can be configured to wait for a longer predetermined duration to confirm the signal. Further, as shown in pose 212, the disclosed systems can be configured to specify that the user's hand should be raised a certain distance above a predetermined position (e.g., the bottom of the head of the user and a waist of the user) to be considered as an activation signal. It should be noted that these gestures and signals are merely representative signals, and any other reasonable gesture can be used to activate the touchless control. In some examples, as shown in pose 214, the disclosed systems can specify that a given gesture and/or the corresponding activation signal may need to be present for predetermined duration (e.g., about 0.25 seconds or more), for example, to avoid accidental activation caused by temporary wrong detection.

In some aspects, gesture detection and subsequent gesture-based touchless control may contain various inherent sources of measurement error. Accordingly, as shown in diagram 216, the disclosed systems can specify that the detected hand position exceeds a predetermined threshold error margin (e.g., approximately 0.05 meters or less) to be considered as an activation signal to register a gesture and/or a hand position. In some examples, if both hands of the user meet the activation criteria described above, the disclosed systems can determine that the hand having a relatively stronger activation signal can serve as the activated hand for purposes of touchless control. If the disclosed systems determine that the hands are at an equal position (e.g., there is a tie), the disclosed systems can specify that the hand that is raised higher be designated as the activated hand.

Figure 2C:
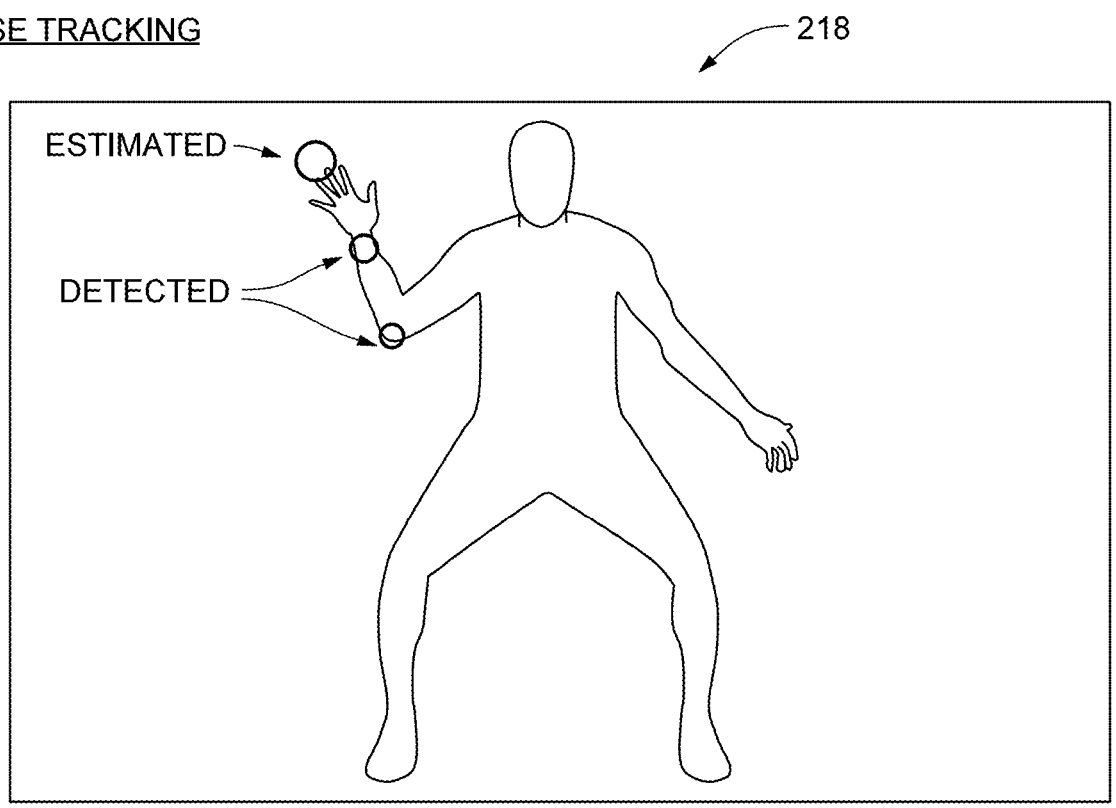
FIG. 2C shows a diagram illustrating the disclosed systems estimating a portion of the user's body from other detected portions of a user's body, in accordance with example embodiments of the disclosure.

FIG. 2C shows a diagram 205 illustrating the disclosed systems estimating a portion of the user's body from other detected portions of a user's body, in accordance with example embodiments of the disclosure. In various embodiments, the disclosed systems can track the portion of the user's body. For example, as shown in boundary box 218, the disclosed systems can estimate the hand position by generating a raw pose estimation detection that can provide an estimate of the elbow and wrist position while not necessarily estimating the hand and/or finger positions. Further, the disclosed systems can provide a hand and/or finger position estimation by running an algorithm that mathematically extends a line from the representation of the user's elbow to the user's wrist.

In various embodiments, the disclosed systems can perform smoothing functionality as part of the tracking and/or touchless control. In particular, the points detected by the system can be noisy. For example, the detected points can have values that exhibit noise and/or jitter, even when the user's limbs are not moving significantly. Accordingly, the disclosed systems can input the position data to, for example, a Kalman filter that can be employed to smooth the detected points.

Figure 2D:
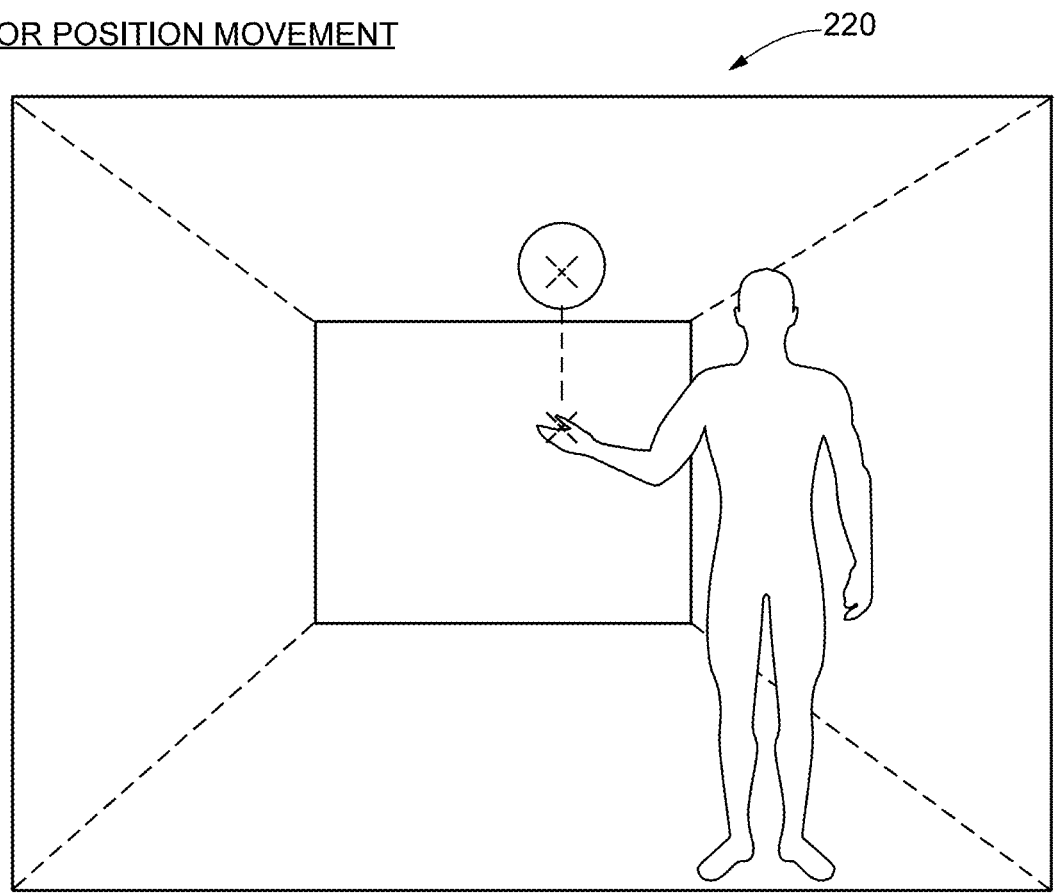
FIG. 2D shows a diagram illustrating the disclosed systems predicting a cursor position from a different cursor position and/or the user's body, in accordance with example embodiments of the disclosure.

FIG. 2D shows a diagram 207 illustrating the disclosed systems predicting a cursor position from a different cursor position and/or the user's body, in accordance with example embodiments of the disclosure. In some examples, the disclosed systems can complete data that neglects data associated with certain positions of the user's body. For example, as shown in boundary box 220, the disclosed systems may temporarily have a lapse in the detection of a portion of the user's body (e.g., an elbow and/or wrist). However, the disclosed systems can be configured such that the user experiences via a display showing that the user's touchless control is seamless. For example, the disclosed systems can use a Kalman filter to predict the position of the detected hand and display the moving position and/or the cursor smoothly, as illustrated schematically in FIG. 2D.

In other examples, the disclosed systems can incorrectly determine the hand of the user. For example, the detected left and right hands may be reversed. In other examples, the detected hands may be mixed (e.g., the left limb may be detected as both the left and the right hand). In these cases, the disclosed systems may be configured to use a best effort algorithm where previous positions are used to resolve the limbs and correctly detect the right and left limbs.

In some examples, the disclosed systems can position the cursor by directly mapping the hand position in the video to a cursor position on the screen of a user device (e.g., a mobile phone). Further, the disclosed systems can improve the user experience such that the user does not need to move his or her hand beyond a particular threshold amount to control the user interface (UI) components on the screen. In particular, the disclosed systems can apply a transformation from the hand to a cursor position, such that the cursor moves faster and more efficiently to the target UI component.

In some examples, the disclosed systems can choose an origin of the hand position to map to the cursor at a center of the screen of the user device. For example, when a right hand is being tracked, the disclosed systems can indicate that a movement of the right hand about 0.2 m right from the user's chest may move the cursor to the center of the screen of the user's device.

In some examples, the disclosed systems can be configured to provide additional smoothing of the cursor during a touchless control session. For example, the disclosed systems can be configured to accept video input of the movements of the hand of the user at about 30 frames per second (fps). Accordingly, in this example, the disclosed systems may perform pose estimation optimally at about 30 fps. However, the user device (e.g., a mobile phone) may have a different refresh rate, for example, a refresh rate of about 60 fps to about 120 fps. Accordingly, if the cursor moves about 30 fps, the cursor may lag in the presentation of the cursor movement to the user.

Thus, the disclosed systems can configure the cursor to not directly move to a target position, but rather, to move to the target progressively at a rate of about 60 fps to about 120 fps, depending on the system. In this example, the disclosed systems can be configured to use an exponential decay or any other suitable technique to smoothly move the cursor to the target position. Further, the disclosed systems can control the coefficients of the exponential decay technique (or other parameters of any suitable technique) to change the effect of the smoothing on the cursor movement.

In some aspects, the disclosed systems can stabilize the position of the cursor during user interaction. For example, when the user holds his or her hand at a relatively stable position, for example, to trigger a button press in a UI component displayed on the screen of the user device, the disclosed systems can be configured such that the cursor position is relatively stable and not jittery. However, the detected data of the user's hand motions from the sensors associated with the user device or other sensors may be inherently noisy and may contribute to jittery motion in the cursor. Accordingly, the disclosed systems can be configured to apply strong exponential decay, such that the cursor position won't change much, and appear to be stable to the user if the cursor is relatively close to its previous position.

In some aspects, the disclosed systems can implement various additional features to improve the user's experience of touchless control. In particular, the disclosed systems can make the cursor appear to move slower when the cursor is near the screen center, and move faster when the cursor is near the screen edge. This different speed of cursor movement based on the position on the screen can allow a user to perform additional fine grain control when UI components are near the center of the screen, while occasionally needing to touch UI components near an edge of the screen. In other examples, the disclosed systems can facilitate user interactions whereby moving the user's body by a predetermined amount can allow the cursor to reach further than without the user's body movement. The disclosed systems can perform this type of user interaction by using historically obtained pose estimation data. In an example, the disclosed systems can use the pose estimation data obtained from the moment of touchless control activation. Further, the disclosed systems can cause the cursor position to depend on the estimated hand position as contrasted with a background of the average positions from the current and the past body positions.

In some examples, the disclosed systems can weigh data obtained from detecting related body parts (e.g., a wrist and an elbow) equally, and use such data in hand and cursor position transformation algorithms such that errors in measuring the wrist and elbow can be averaged out. This can be contrasted with the disclosed systems, weight data obtained from one of the related body parts (e.g., the wrist node) more than the other (e.g., via extrapolation). Such an imbalanced weighing may make errors associated with the weighted body part (e.g., the wrist nodes) more exaggerated.

In some examples, the disclosed systems can normalize the movements of a portion of the user's body (e.g., the user's hand) by the user's body width and/or height. Accordingly, the disclosed systems can provide a similar touchless control experience for users having different sizes and/or heights.

In some examples, the disclosed systems can determine that a particular mapping between a portion of the user's body and the screen may not be ideal. For example, the disclosed systems may determine that for the user's right hand, a pose in which the user's hand is at the top right position may be further away to the right of the user's body than a pose in which the user's hand is at the bottom right of the user's body. Accordingly, the disclosed systems may determine that a rectangular transform applied to map the user's hand position to the screen position may not be ideal, and that instead, a trapezoid-like transform (e.g., a perspective transform) may be preferable.

In some examples, the disclosed systems can implement an algorithm to detect hand switching and/or to perform a deactivation. In particular, the disclosed systems may attempt to map an activated hand. However, when there is strong signal that another hand is preferred, the disclosed systems can activate the other hand, for example, when another hand meets an activation criteria. In another aspect, when the activation signal is not strong, the disclosed systems can be configured to consider switching from tracking one hand to another hand when the currently tracked hand meets a predetermined deactivation criteria (e.g., when the currently tracked hand is determined to fall about 0.5 m below the position at the top of the screen).

In some examples, there may be a number of ways and/or reasons to deactivate the touchless control. For example, the disclosed systems may determine that no valid pose has been detected. In other examples, the disclosed systems may determine that a pose is detected; however, the disclosed systems may determine that the pose is outside the bounds of the screen, away from the center of the screen by a predetermined amount, or that the user's detected pose is too close and/or too far from the screen. In some examples, the disclosed systems may deactivate the touchless control after determining that while a given portion of the body is activated (e.g., the user's right hand is activated), the disclosed systems do not necessarily detect a signal from a related portion of the user's body (e.g., valid signal from right elbow and/or wrist of the user). In some examples, the disclosed systems may determine that if the user's hand is below a user's hip, and the user's hand is not moving, the user's hand in this case can serve as a deactivation signal. In some cases, the disclosed systems can deactivate the touchless control after the deactivation criteria is matched for a predetermined amount of time.

Implementation Using Computer Program Products, Methods, and Computing Entities

The present invention may be implemented in a combination of hardware and/or software. An illustrative hardware and software operational environment for implementing one embodiment of the present invention is now described.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

Figure 3:
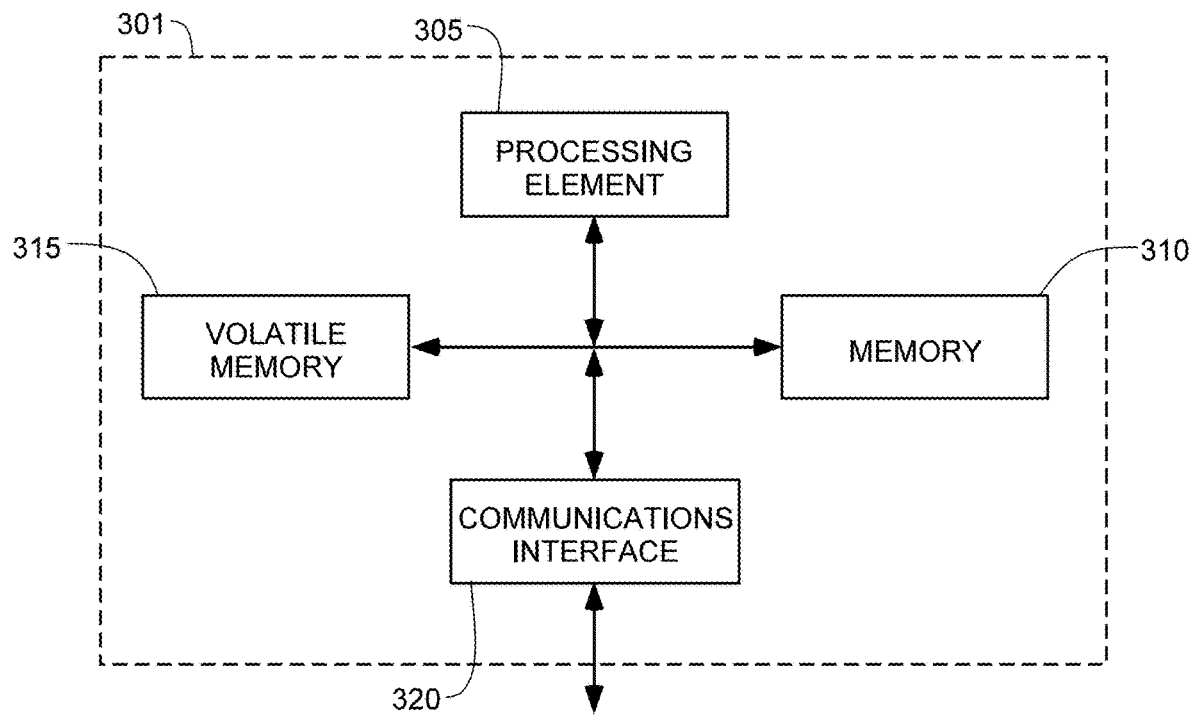
FIG. 3 is an exemplary schematic diagram of a management computing entity for implementing the present invention, in accordance with example embodiments of the disclosure.
Figure 4:
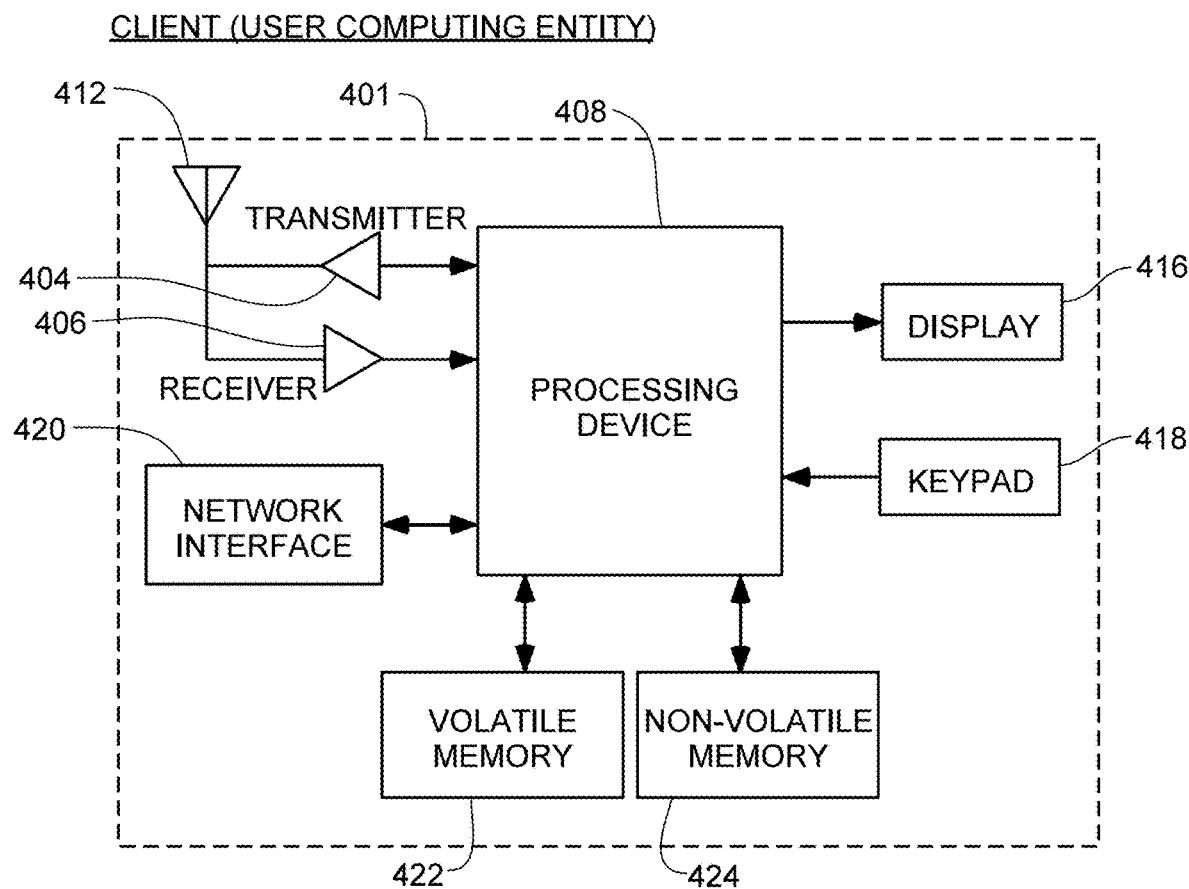
FIG. 4 is an exemplary schematic diagram of a user computing entity for implementing the present invention, in accordance with example embodiments of the disclosure.

An exemplary embodiment of the present disclosure may include one or more management computing entities 301, one or more networks, and one or more user computing entities 401, as shown in FIGS. 3-4. Each of these components, entities, devices, systems, and similar words used herein interchangeably may be in direct or indirect communication with, for example, one another over the same or different wired or wireless networks. Additionally, while FIGS. 3-4 illustrate the various system entities as separate, standalone entities, the various embodiments are not limited to this particular architecture.

Exemplary Management Computing Entity

FIG. 3 provides a schematic 300 of a management computing entity 301 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 301 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management computing entity 301 may communicate with user computing entities 401 and/or a variety of other computing entities.

As shown in FIG. 3, in one embodiment, the management computing entity 301 may include or be in communication with one or more processing elements 305 (also referred to as processors, processing circuitry, and/or similar terms used herein interchangeably) that communicate with other elements within the management computing entity 301 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), microcontrollers, and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the management computing entity 301 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 301 may further include or be in communication with volatile media (also referred to as volatile storage, memory, memory storage, memory circuitry and/or similar terms used herein interchangeably). In one embodiment, the volatile storage or memory may also include one or more volatile storage or memory media 315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 301 with the assistance of the processing element 305 and operating system.

As indicated, in one embodiment, the management computing entity 301 may also include one or more communications interfaces 320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 301 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 301 may include or be in communication with one or more input elements, such as a keyboard input, a mouse input, a touch screen/display input, motion input, movement input, audio input, pointing device input, joystick input, keypad input, and/or the like. The management computing entity 301 may also include or be in communication with one or more output elements (not shown), such as audio output, video output, screen/display output, motion output, movement output, and/or the like.

As will be appreciated, one or more of the components of the management computing entity 301 may be located remotely from other management computing entity 301 components, such as in a distributed system. Furthermore, one or more of the components may be combined and additional components performing functions described herein may be included in the management computing entity 301. Thus, the management computing entity 301 can be adapted to accommodate a variety of needs and circumstances. As will be recognized, these architectures and descriptions are provided for exemplary purposes only and are not limiting to the various embodiments.

Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like. For instance, a user may operate a user computing entity 401 that includes one or more components that are functionally similar to those of the management computing entity 301. FIG. 4 provides an illustrative schematic 400 representative of a user computing entity 401 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 401 can be operated by various parties. As shown in FIG. 4, the user computing entity 401 can include an antenna 412, a transmitter 404 (e.g., radio), a receiver 406 (e.g., radio), and a processing element 408 (e.g., CPLDs, microprocessors, multi-core processors, coprocessing entities, ASIPs, microcontrollers, and/or controllers) that provides signals to and receives signals from the transmitter 404 and receiver 406, respectively.

The signals provided to and received from the transmitter 404 and the receiver 406, respectively, may include signaling information in accordance with air interface standards of applicable wireless systems. In this regard, the user computing entity 401 may be capable of operating with one or more air interface standards, communication protocols, modulation types, and access types. More particularly, the user computing entity 401 may operate in accordance with any of a number of wireless communication standards and protocols, such as those described above with regard to the management computing entity 301. In a particular embodiment, the user computing entity 401 may operate in accordance with multiple wireless communication standards and protocols, such as 5G, UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 401 may operate in accordance with multiple wired communication standards and protocols, such as those described above with regard to the management computing entity 301 via a network interface 420.

Via these communication standards and protocols, the user computing entity 401 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 401 can also download changes, add-ons, and updates, for instance, to its firmware, software (e.g., including executable instructions, applications, program modules), and operating system.

According to one embodiment, the user computing entity 401 may include location determining aspects, devices, modules, functionalities, and/or similar words used herein interchangeably. For example, the user computing entity 401 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 401 position in connection with a variety of other systems, including cellular towers, Wi-Fi access points, and/or the like. Similarly, the user computing entity 401 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 401 may also comprise a user interface (that can include a display 416 coupled to a processing element 408) and/or a user input interface (coupled to a processing element 408). For example, the user interface may be a user application, browser, user interface, and/or similar words used herein interchangeably executing on and/or accessible via the user computing entity 401 to interact with and/or cause display of information from the management computing entity 301, as described herein. The user input interface can comprise any of a number of devices or interfaces allowing the user computing entity 401 to receive data, such as a keypad 418 (hard or soft), a touch display, voice/speech or motion interfaces, or other input device. In embodiments including a keypad 418, the keypad 418 can include (or cause display of) the conventional numeric (0-9) and related keys (#, *), and other keys used for operating the user computing entity 401 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 401 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 401. As indicated, this may include a user application that is resident on the entity or accessible through a browser or other user interface for communicating with the management computing entity 301 and/or various other computing entities.

In another embodiment, the user computing entity 401 may include one or more components or functionality that are the same or similar to those of the management computing entity 301, as described in greater detail above. As will be recognized, these architectures and descriptions are provided for exemplary purposes only and are not limiting to the various embodiments.

Machine Vision and Machine Learning Modules

The present invention may be implemented using one or more machine vision and machine learning modules implementing one or more algorithms implemented in non-transitory storage medium having program code stored thereon, the program code executable by one or more processors, as described above. The following description describes in detail some of the illustrative machine vision and machine learning algorithms useful for implementing some embodiments of the present invention.

Illustrative Machine Vision Architectures

Various exemplary machine vision algorithms are within the scope of the present invention used for performing gesture recognition, performing pose estimation, applying smoothing functions to cursor positions, and so forth.

Figure 5:
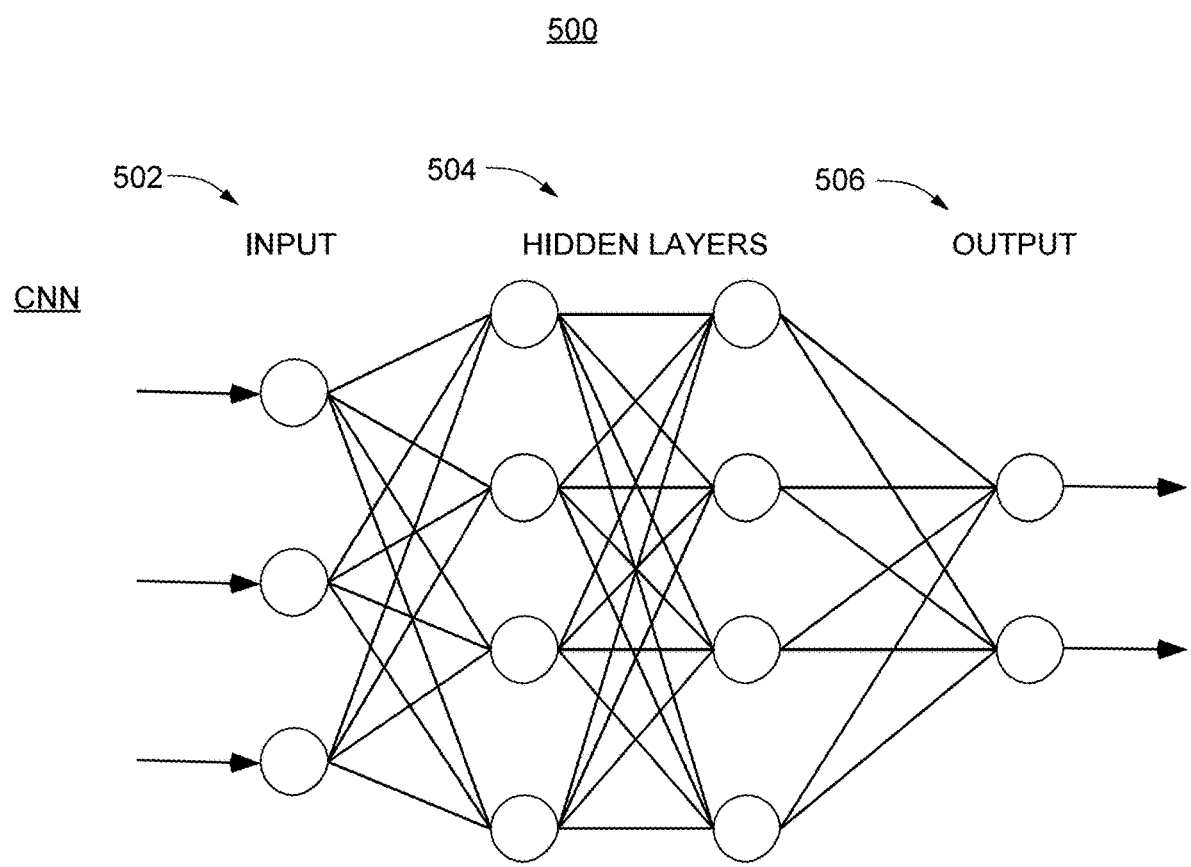
FIG. 5 shows an illustrative block diagram of a convolutional neural network (CNN) for image analysis, in accordance with one embodiment of the invention.

Some exemplary machine vision algorithms utilize a deep learning network (DLN), for example using a convolutional neural network (CNN). FIG. 5 shows an exemplary CNN module 500 that may be utilized for implementing various machine vision algorithms described herein. In FIG. 5, one or more input layers 502 are connected via a multiplicity of hidden layers 504 to one or more output layers 506. This neural network architecture may be trained to determine gestures and poses and other machine vision tasks required by the present invention, as would be recognized by one of ordinary skill in the art. FIG. 5 shows only one illustrative CNN architecture that is within the scope of the present invention, and the present invention is not limited to the use of CNNs. Other machine vision algorithms are also within the scope of the present invention. One specific CNN architecture is described below.

Illustrative Machine Learning Architectures

Various exemplary machine learning algorithms are within the scope of the present invention used for performing image recognition, gesture recognition, pose estimation, and so forth.

Figure 6:
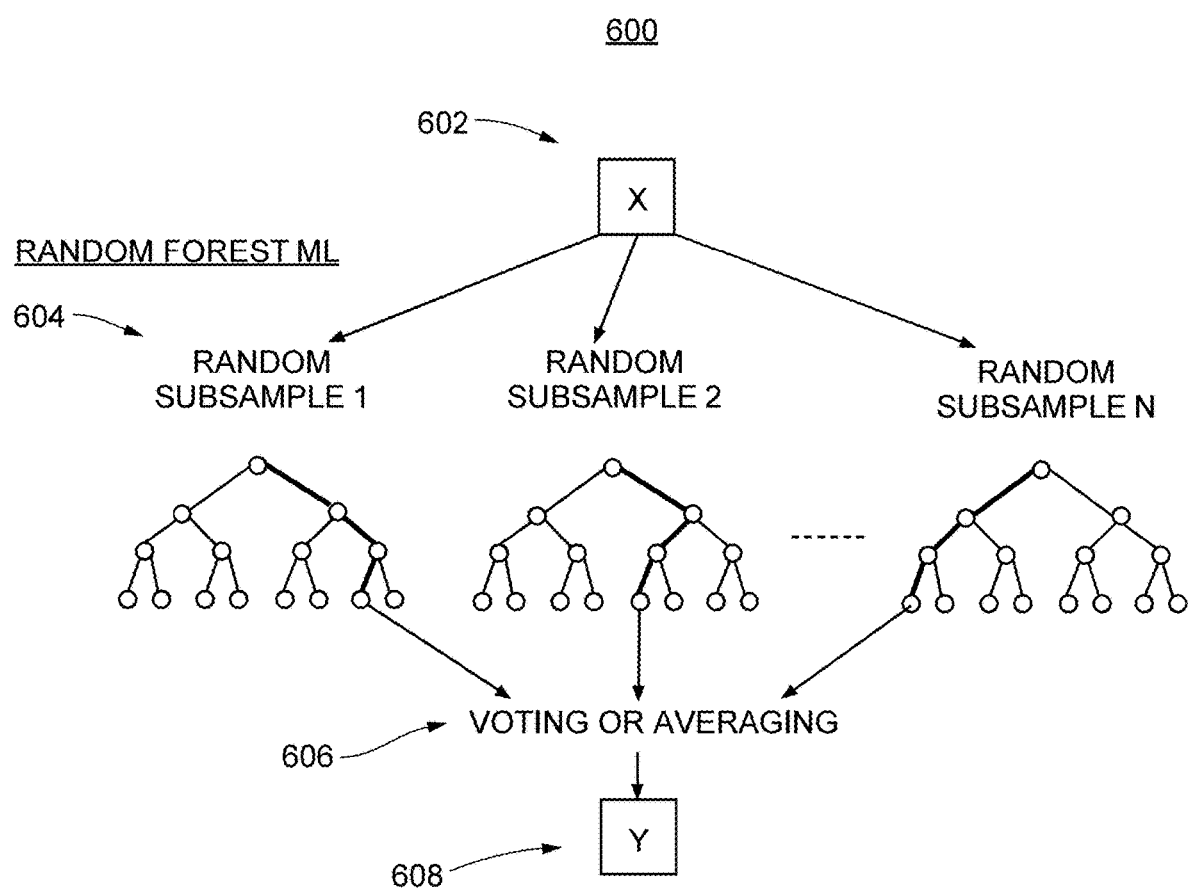
FIG. 6 shows an illustrative block diagram for a machine learning algorithm, in accordance with another embodiment of the invention.

FIG. 6 shows an illustrative diagram 600 for a machine learning algorithm used to implement image recognition, gesture recognition, pose estimation, in accordance with sample embodiments of the invention. In one embodiment, the machine learning algorithm comprises a random forest algorithm, one illustrative machine learning algorithm. Random forest algorithms use a multitude of decision tree predictors 604, such that each decision tree depends on the values of a random subset of the training data, which minimizes the chances of overfitting to the training data set. The decision tree predictors are voted or averaged 606 to obtain the predictions of the random forest algorithm. In one embodiment, the random forest algorithm is implementation as described in Leo Breiman, *Random Forests*, Machine Learning, 45, 5-32, 2001, Kluwer Academic Publishers, Netherlands, available at doi.org/10.1023/A:1010933404324. Random forest is only one illustrative machine learning algorithm that is within the scope of the present invention, and the present invention is not limited to the use of random forest. Other machine learning algorithms, including but not limited to, regressors, nearest neighbor algorithms, decision trees, support vector machines (SVM), Adaboost, Bayesian networks, fuzzy logic models, various neural networks including deep learning networks, evolutionary algorithms, and so forth, are within the scope of the present invention. The input to the machine learning algorithm can include the feature values 602$(x)$, or the input data described above. The output 608 of the machine learning algorithm can include the predicted gestures and/or poses associated with a user.

As noted, embodiments of devices and systems (and their various components) described herein can employ artificial intelligence (AI) to facilitate automating one or more features described herein (e.g., performing image recognition, gesture recognition, pose estimation). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier may map an input attribute vector, $z=(z1, z2, z3, z4, \ldots, zn)$, to a confidence that the input belongs to a class, as by $f(z)=confidence(class)$. Such classification may employ a probabilistic and/or statistical-based analysis (e.g., factoring into the analysis utilities and costs) to determine an action to be automatically performed. Another example of a classifier that can be employed is a support vector machine (SVM). The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Training the Machine Learning Algorithms

Figure 7:
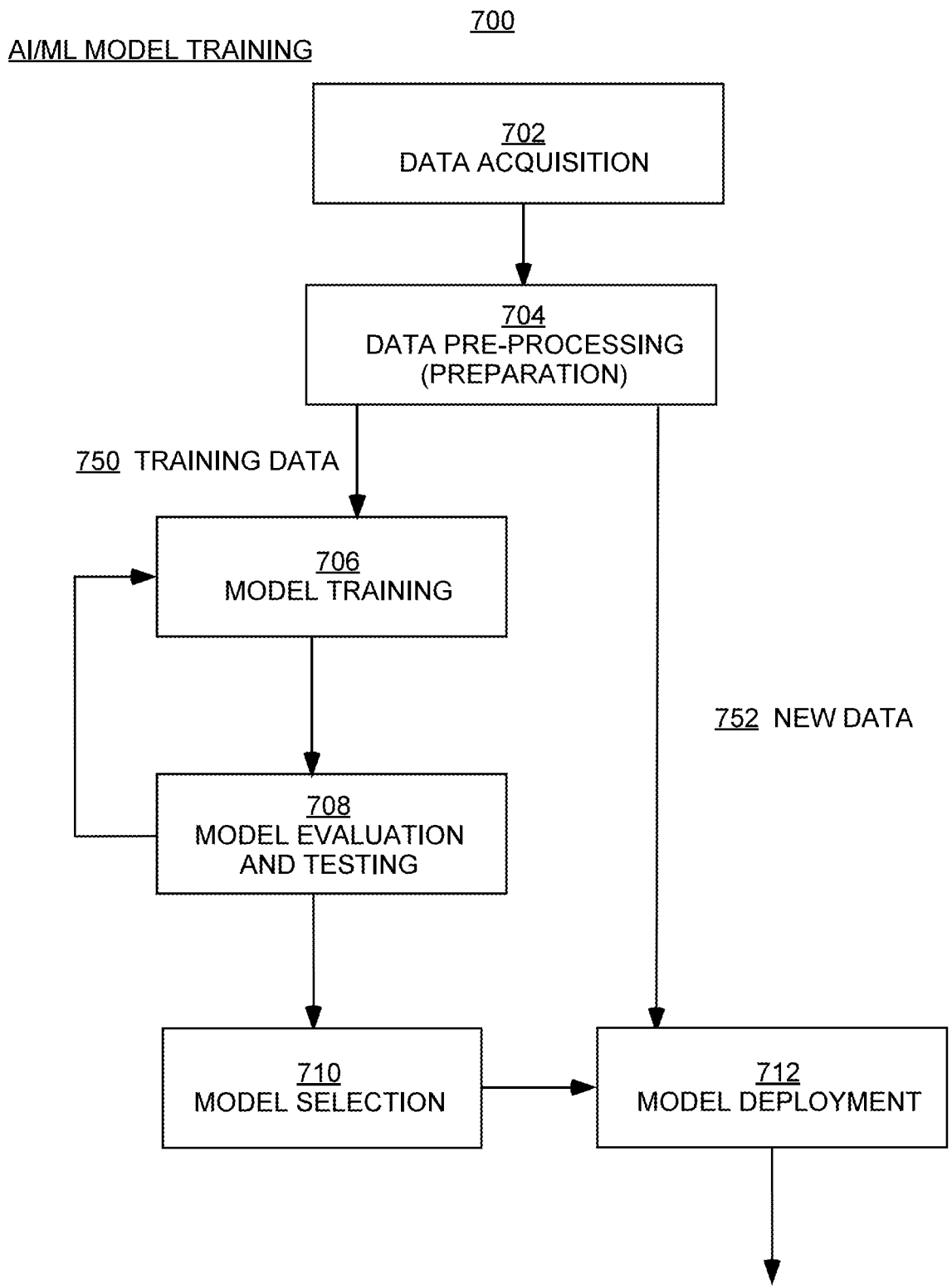
FIG. 7 shows an example flow diagram for training the machine learning algorithm, in accordance with example embodiments of the disclosure.

FIG. 7 shows an exemplary flow diagram 700 for training the machine learning (ML) algorithms, which are utilized in predicting gestures and/or poses of users performing touchless control, in accordance with example embodiments of the present invention. The training process begins at step 702, with data acquisition. At step 704, the acquired data is pre-processed (known as data preparation). At step 706, the model is trained using training data 750. At step 708, the model is evaluated and tested, and further refinements to the model are fed back into step 706. At step 710, the optimal model parameters are selected. At step 712, the model is deployed. New data 752 can now be used by the deployed model to make predictions.

A starting point for any machine learning method such as used by the machine learning component above is a documented dataset containing multiple instances of system inputs and correct outcomes (e.g., the training data). This data set can be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system output depends on (a) the pattern parameterization, (b) the learning machine design, and (c) the quality of the training database. These components can be refined and optimized using various methods. For example, the database can be refined by adding datasets for new documented gestures and poses. The quality of the database can be improved, for example, by populating the database with cases in which the gestures and/or poses were correctly recognized. In one embodiment, the database includes data, for example, of mistaken identification of gestures and/or poses, which can assist in the evaluation of a trained system.

Exemplary Convolutional Neural Networks (CNNs) for Pose Estimation

Figure 8A:
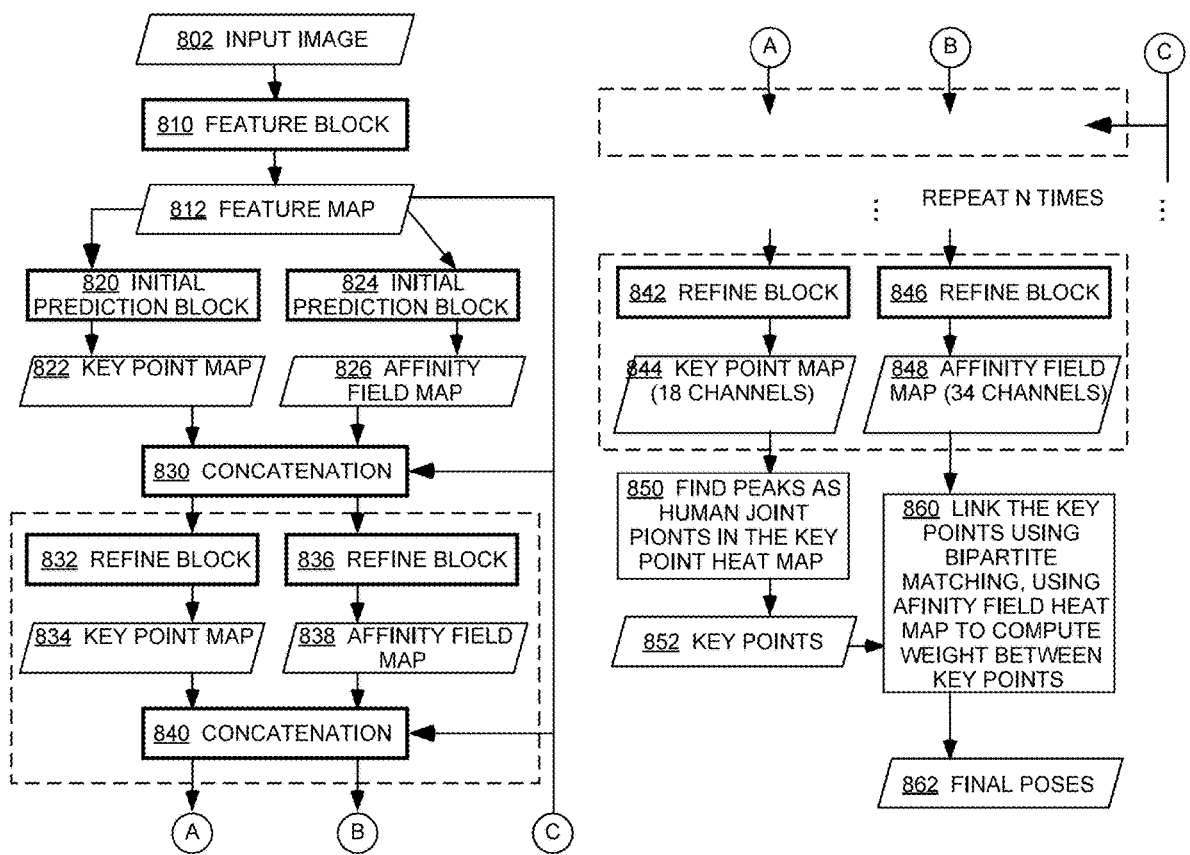
FIG. 8A is a block diagram of an exemplary convolutional neural network (CNN) for pose estimation, in accordance with example embodiments of the disclosure.

FIG. 8A is a block diagram 800 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 8A performs the following steps to estimate the pose of one or more persons in an input image:

1. Use a convolutional network block as a feature extractor to compute a feature map from an input image;
2. Turn the feature map into a keypoint heat map and an affinity field heat map using another convolutional network block;
3. Refine the keypoint heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the keypoints using the affinity field heat map.

More specifically, input image 802 is first passed through a feature block 810 to generate feature map 812. Initial prediction blocks 820 and 824 then extract keypoint map 822 and affinity field map 826, respectively. A concatenation operation 830 is performed before further refinements are carried out in multiple iterations. For each stage of iteration, refine blocks such as 832, 836, 842, and 846 predict refined keypoint maps such as 834 and 844, and affinity field maps such as 838 and 848, respectively. Concatenation operations such as 840 are performed to generate input for the next stage. A total of N refinements may be carried out. For example, N may equal to 5 in some embodiments of the present invention. After the last refinement stage, keypoint heat map 844 is examined in step 850 to find peaks as human joint points or keypoints 852. Such keypoints may be linked in step 860 to generate final poses 862, by performing bipartite matching using affinity field heat map 848 to compute weights between keypoints. In this illustrative example, keypoint map 844 may comprise 18 channels, while affinity field map 848 may comprise 34 channels.

FIG. 8B is a detailed block diagram illustrating an exemplary Feature Block 810, according to some embodiments of the present invention. In this example, separable convolutional layers (SCL) are deployed with different kernel and stride sizes.

Correspondingly, FIG. 8C is a detailed block diagram illustrating an exemplary separable convolutional neural network layer 870, according to some embodiments of the present invention. As discussed previously, a depth-wise separable convolution or a separable convolution layer factorizes a standard convolution into a depth-wise convolution and a point-wise convolution. Batch optimization and ReLU blocks further help improve the accuracy and performance of the network layer.

Figure 8D:
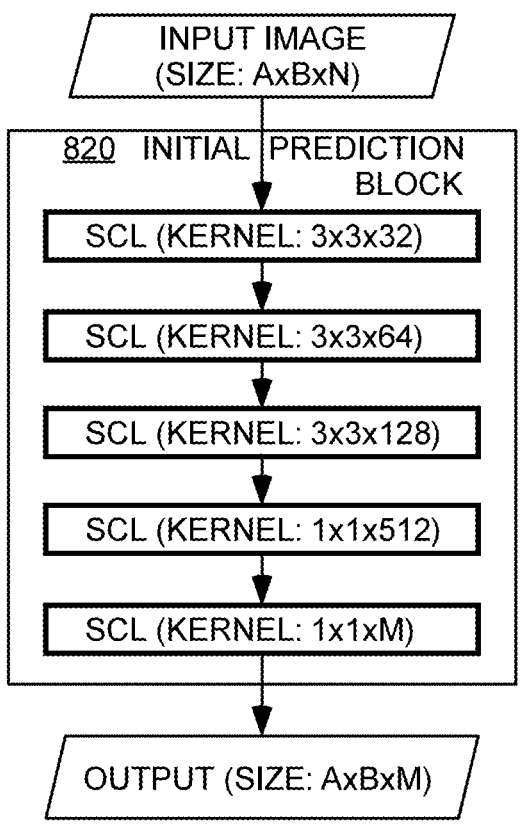
FIG. 8D is a detailed block diagram illustrating an exemplary Initial Prediction Block, in accordance with example embodiments of the disclosure.
Figure 8E:
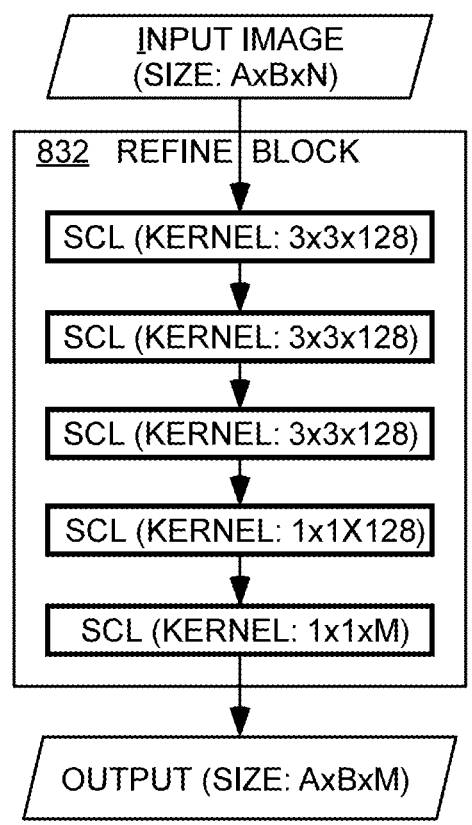
FIG. 8E is a detailed block diagram illustrating an exemplary Refine Block, in accordance with example embodiments of the disclosure.

FIG. 8D is a detailed block diagram illustrating an exemplary Initial Prediction Block 820, according to some embodiments of the present invention. Finally, FIG. 8E is a detailed block diagram illustrating an exemplary Refine Block 832, according to some embodiments of the present invention. Both comprise multiple separable convolutional layers having different kernel sizes.

Illustrative Exemplary Processes for Touchless Control

Figure 9:
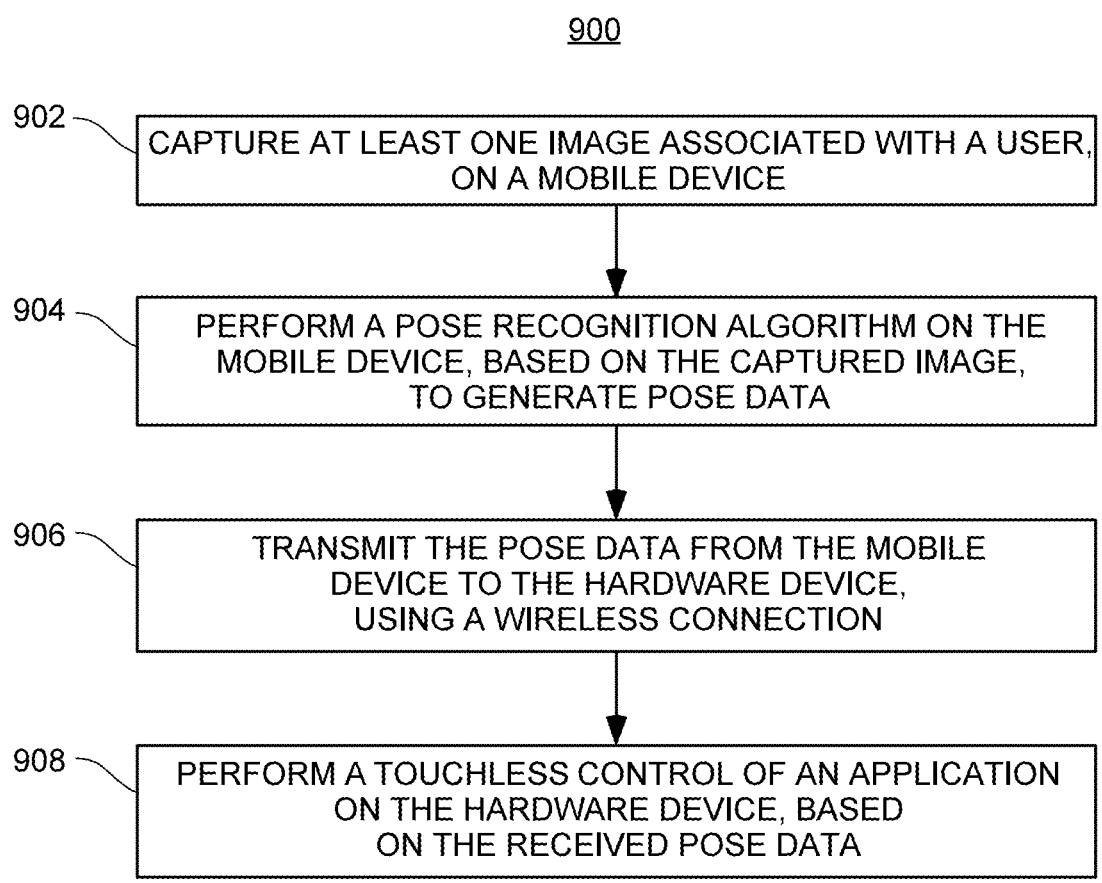
FIG. 9 shows a flowchart diagram illustrating example operations for offloading pose processing to a mobile device for motion tracking on a hardware device without a camera and/or without a sufficiently powerful hardware processor, in accordance with example embodiments of the disclosure.

FIG. 9 shows a flowchart diagram illustrating example operations for offloading pose processing to a mobile device for motion tracking on a hardware device without a camera, in accordance with example embodiments of the disclosure. Specifically, the flowchart diagram 902 illustrates an exemplary method for motion tracking on a hardware device without a camera and/or without a sufficiently powerful hardware processor by offloading pose processing to a mobile device. At step 902, the method includes capturing at least one image associated with a user, on the mobile device. At step 904, the method includes performing a pose recognition algorithm on the mobile device, based on the captured image, to generate pose data. At step 906, the method includes transmitting the pose data from the mobile device to the hardware device, using a wireless connection. In some embodiments, a wireline (e.g., Ethernet LAN) or Internet connection is used. Finally, at step 908, the method includes performing a touchless control of an application on the hardware device, based on the received pose data.

Figure 10:
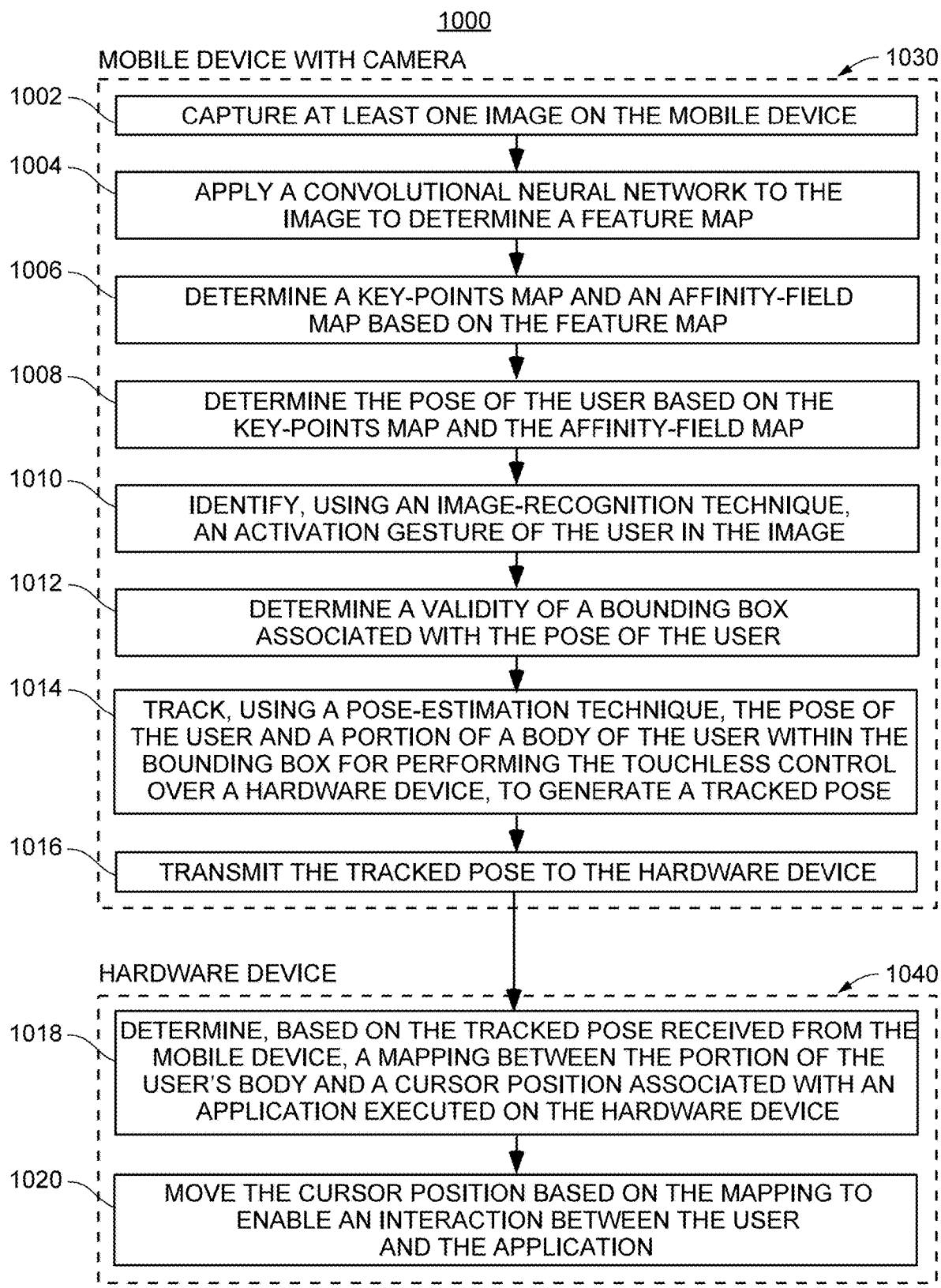
FIG. 10 shows a flowchart diagram illustrating more detailed example operations for offloading pose processing to a mobile device for motion tracking on a hardware device without a camera and/or without a sufficiently powerful hardware processor, in accordance with example embodiments of the disclosure.

FIG. 10 shows a flowchart diagram illustrating more detailed example operations for offloading pose processing to a mobile device for motion tracking on a hardware device without a camera, in accordance with example embodiments of the disclosure. Specifically, FIG. 10 shows a flowchart diagram 1000 illustrating an exemplary method for touchless control of an application on a hardware device without a camera and/or without a sufficiently powerful hardware processor, by offloading pose processing to a mobile device, in accordance with example embodiments of the disclosure. As shown in FIG. 10, the initial steps of the method 1030 are carried out by the mobile device with the camera, whereas the final steps 1040 are carried out on the hardware device without a camera and/or without a sufficiently powerful hardware processor. At step 1002, the method includes capturing at least one image associated with a user on the mobile device. At step 1004, the method includes applying a CNN to the image to determine a feature map. In some aspects, the image can be received from a single mobile device camera. In other examples, the image can be part of video (e.g., a video frame), and there can be many images as part of the video, any number of which can be processed (e.g., via the CNN) to obtain the feature map. In some examples, the CNN can process the various regions of the image to generate a number. Further, the CNN can slide a filter over all the regions during processing to generate arrays of numbers, which can be referred to as a feature map. Accordingly, the feature map can serve as a function which maps a data vector (e.g., data associated with the image) to a feature space, a mathematical space that includes features which can include an individual measurable property or characteristic of the poses and gestures being observed.

At step 1006, the method includes determining a keypoints map and an affinity-field map based on the feature map, followed by determining a pose of the user based on the keypoints map and the affinity-field map at step 1008. In particular, the disclosed systems can extract coordinates in a skeletal representation of the pose of the user which can include determining joints that can be referred to as keypoints. In some examples, the affinity map can represent the degree of association between the keypoints and can encode joint-to-joint relationships.

At step 1010, the method includes identifying, using an image-recognition technique, an activation gesture of the user in the image, and determining a validity of a bounding box associated with the pose of the user. In other aspects, the disclosed systems can identify the activation gesture by determining that the activation gesture has an associated duration exceeding a predetermined threshold. Further, the predetermined threshold can be based on a configuration of the activation gesture. For example, a gesture involving the user's hands being above the head of the user can have a given duration threshold while a gesture involving the user displaying a particular hand holding a particular finger in a given orientation can have a different duration threshold. In some examples, in step 1012, the disclosed systems determine the validity of the bounding box by determining that the bounding box is within threshold margins of an active area of the user device, as shown and described in connection with FIG. 2A.

At step 1014, the method includes tracking, using a pose-estimation technique, the pose of the user and a portion of a body of the user within the bounding box for performing the touchless control over hardware device without a camera and/or without a sufficiently powerful hardware processor, to generate a tracked pose. In particular, the disclosed systems can track the portion of the user's body by applying any suitable pose-estimation technique. Further, the disclosed systems can track the portion of the user's body by applying a smoothing filter (e.g., a Kalman filter) to reduce noisy measurements during the tracking. In other examples, the disclosed systems can generate, using any suitable prediction technique (e.g., machine learning, extrapolation, etc.), a prediction of a location of the user's body at a future time.

In some examples, the disclosed systems can track the pose of the user at a frame rate (e.g., via a camera that runs at about a 30 fps frame rate). Further, the disclosed systems can determine that a value of a refresh rate associated with the user device is different from a value of the frame rate. For example, the disclosed systems can determine that the user's mobile device has a rate of about 60 fps to about 120 fps. Accordingly, the disclosed systems can be configured to move the cursor position using a smoothing function, for example, to reduce the amount of jitter and mismatch that may otherwise exist in moving the cursor position based on the tracking frame rate only. Further, the smoothing function can include parameters that are determined based on the frame rate and the refresh rate. At step 1016, the method includes transmitting the tracked pose to the hardware device.

At step 1018, the method includes determining, at the hardware device, based on the tracked pose received from the mobile device, a mapping between the portion of the user's body (e.g., hands) and a cursor position associated with an application executed on the hardware device. The disclosed systems can use the mapping to move the cursor position in near real-time. In other examples, the disclosed systems can determine a second mapping between a second portion of the user's body (e.g., wrist, elbows, etc.) and the cursor position by applying a mathematical transformation to a representation of the portion of the user's body. In particular, the second mapping can be used to move the cursor position with a finer degree of user control.

Finally, at step 1020, the method includes moving the cursor position based on the mapping to enable an interaction between the user and the application. In some examples, the disclosed systems can be configured to move the cursor position at an increased speed or at an increased precision based on the second mapping, described above. Further, the disclosed systems can be configured to stabilize the cursor. In particular, the disclosed systems can be configured to determine that a difference between the cursor position and a previous cursor position is within a difference threshold (e.g., a few percentage points with respect to the size of the screen), and then apply a cursor stabilization function to the cursor position. The cursor stabilization function can include any suitable technique such as a position averaging, smoothing, and/or the like. In some examples, the disclosed systems can be configured to move the cursor with different speeds based on the location of the cursor. That is, the disclosed systems can move the cursor position at a first speed and a second speed different from the first speed, wherein the first speed and the second speed are based on the cursor position with respect to an active area of the user device.

In some embodiments of the present invention, elements of pose detection and tracking may be carried out on the hardware device. For example, in one embodiment of the present invention, the pose data transmitted from the mobile device with a camera to the hardware device without a camera and/or without a sufficiently powerful hardware processor comprises the feature map determined in step 1004, based on the image captured in step 1002. In this embodiment, steps 1006 to 1014 are carried out by the hardware device rather than the mobile device, and the tracked pose is generated on the hardware device. In another embodiment of the present invention, the pose data transmitted from the mobile device with a camera to the hardware device without a camera and/or without a sufficiently powerful hardware processor comprises the keypoints map and the affinity-field map determined in step 1006. In this embodiment, steps 1008 to 1014 are carried out by the hardware device rather than the mobile device, and the tracked pose is generated on the hardware device.

In various embodiments, the cursor includes any user-controlled graphical element on a device screen. In some embodiments, the cursor may take any shape and may include any object associated with a software application, as represented on the device screen. In one embodiment, the cursor may include a virtual avatar representing the user, or a part of such a virtual avatar.

The methods described herein enable the flexible distribution of the tasks and operations required for pose processing between the mobile device and the hardware device, in accordance with their processing capabilities. In some embodiments, the methods described herein thus allocate some of the processing power to the hardware device. For example, the application on the hardware device may be required to deserialize the received data stream, and decode it to generate meaningful pose data for the application. Compared to the neural network inference performed on the mobile device, the processing power required for deserialization on the hardware device may indeed be, in general, very small.

Example of an Application on a TV Controlled by a Mobile Device

This example is provided for illustrative purposes only and the invention is not limited to the applications shown here. Other applications are considered to be within the scope of the present invention as described herein.

Figure 11:
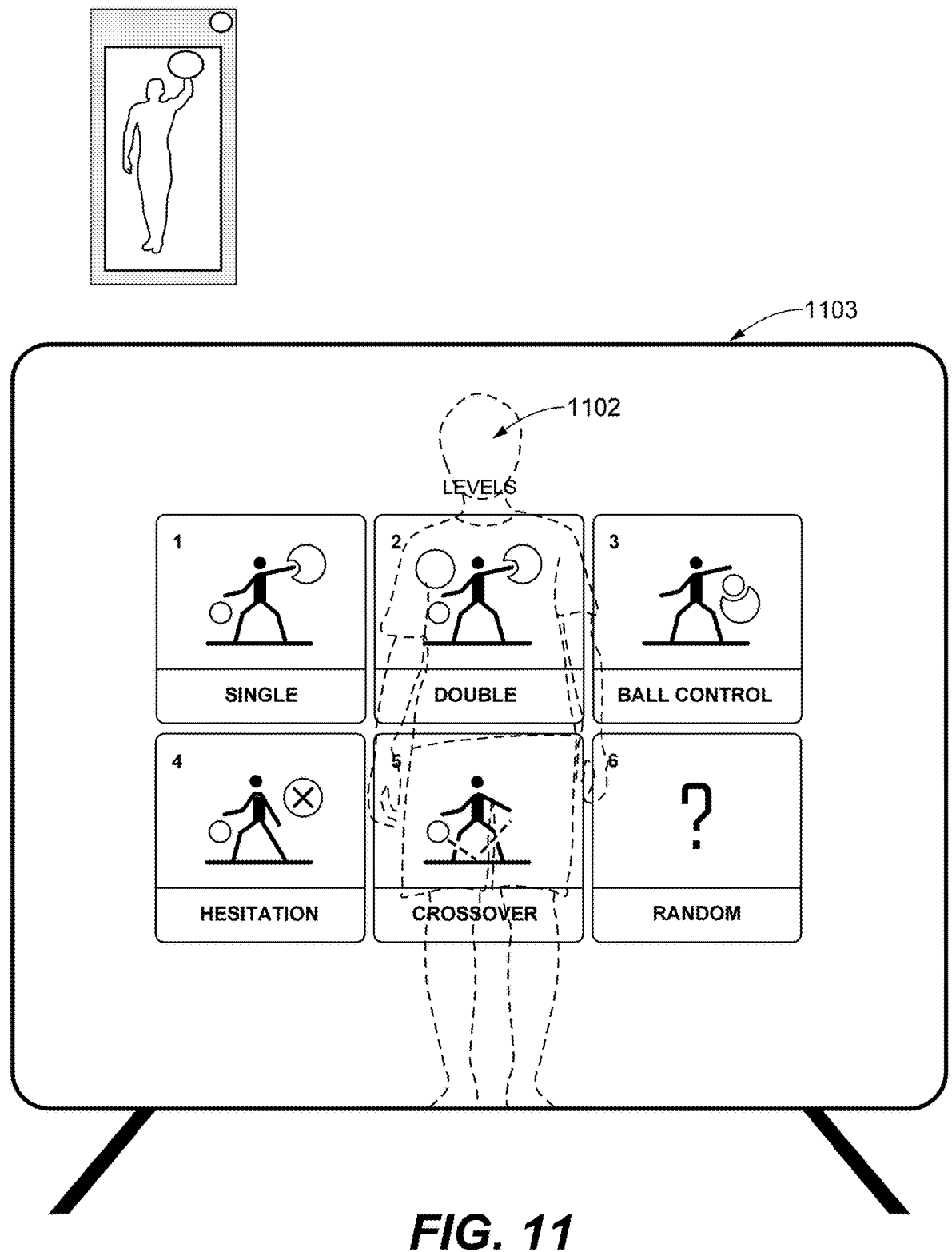
FIG. 11 shows a diagram illustrating a user in a background position with respect to a camera of a user device showing a GUI (graphical user interface) in a foreground, leading to the disclosed systems detecting a presence of the user, in accordance with example embodiments of the disclosure.

FIG. 11 shows a diagram of a TV screen illustrating a user 1102 in a background position (dashed lines) with respect to a camera of a mobile device displaying a graphical user interface (GUI) 1103 in a foreground (solid lines), leading to the disclosed systems detecting a presence of the user 1102, in accordance with example embodiments of the disclosure. The mobile device used to control the TV application is shown above the TV set. The presence of the user 1102 is detected based on a pose, bounding box, and/or other suitable means as described herein. The GUI 1103 displays one or more control elements which may be controlled by touchless control by the user 1102 as described herein.

Figure 12:
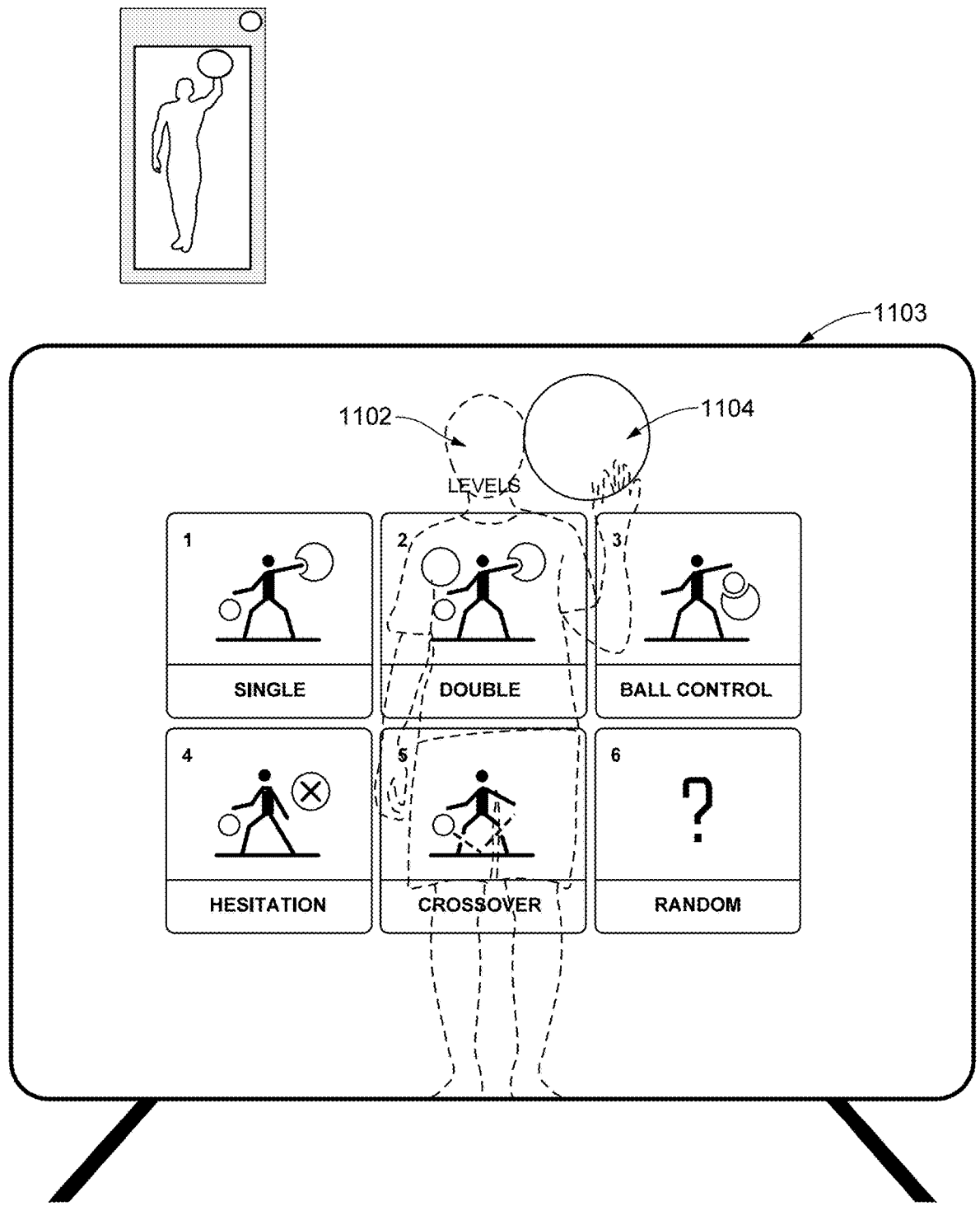
FIG. 12 shows a diagram illustrating the user having an illustrative activation gesture that is interpreted by the disclosed systems to activate a tracking of the user's hand, in accordance with example embodiments of the disclosure.

FIG. 12 shows a diagram of a TV screen illustrating the user 1102 having an illustrative activation gesture that is interpreted by the disclosed systems to activate a tracking of the user's left hand ("stage right"), in accordance with example embodiments of the disclosure. The mobile device used to control the TV application is shown above the TV set. The activation gesture may be one of any suitable activation gestures as described herein. The detection of the activation gesture on the mobile device triggers the display of a cursor 1104 on the GUI 1103 on the TV. The activation gesture may be detected by any suitable means as described herein.

Figure 13:
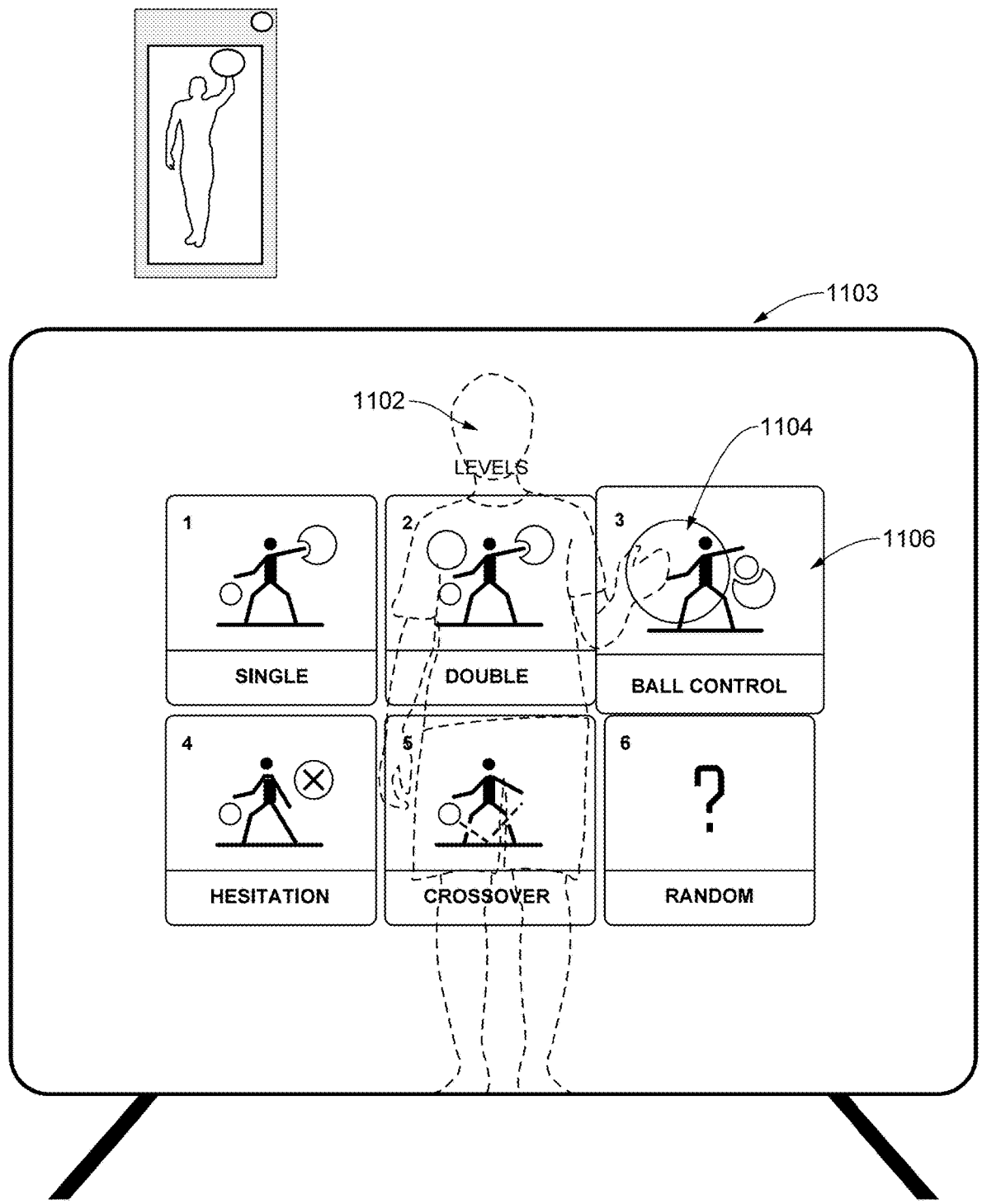
FIG. 13 shows a diagram illustrating the disclosed systems tracking a pose of the user and estimating a location of the user's hand hovering over a selection of a control element in the GUI, in accordance with example embodiments of the disclosure.

FIG. 13 shows a diagram of a TV screen illustrating the disclosed systems tracking a pose of the user 1102 and estimating a location of the user's hand controlling a cursor 1104 hovering over a selection of a control element 1106 in the GUI 1103, in accordance with example embodiments of the disclosure. The mobile device used to control the TV application is shown above the TV set. In one embodiment, the selection of the control element 1106 needs to be confirmed via visual feedback to the user 1102 on the GUI 1103 of the hardware device. For example, the selection of the control element 1106 may be displayed back to the user 1102 with a highlight, a change in color, a blinking motion, or any other suitable means used to present control element feedback in the GUI 1103 of the hardware device.

Figure 14:
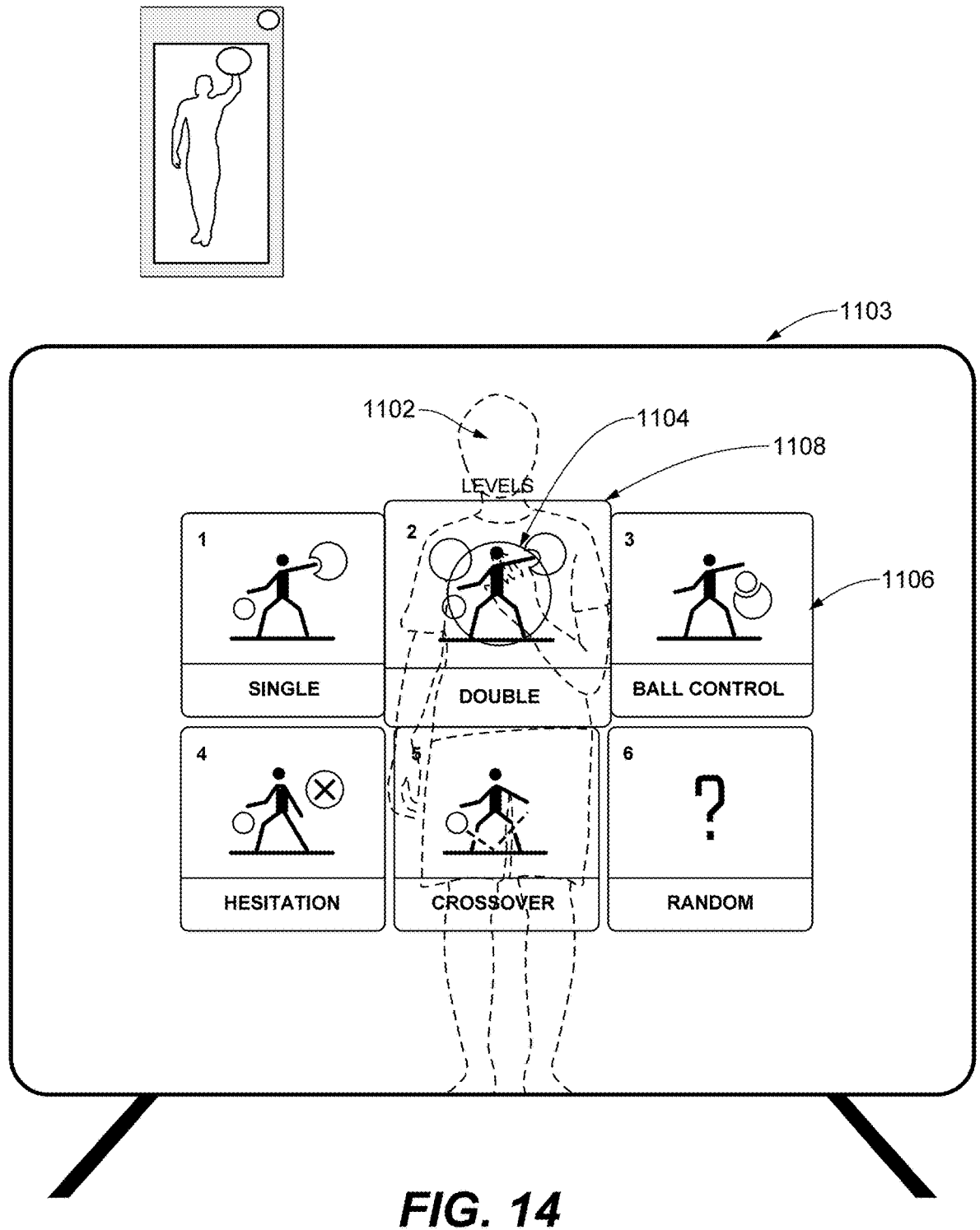
FIG. 14 shows a diagram illustrating the disclosed systems allowing the user to confirm the selection by hovering over the control element in the GUI for a predetermined period of time, in accordance with example embodiments of the disclosure.

Finally, FIG. 14 shows a diagram of a TV screen illustrating the disclosed systems allowing the user 1102 to confirm his or her selection by hovering the cursor 1104 over another control element 1108 (different from control element 1106) in the GUI 1103 for a predetermined period of time, in accordance with example embodiments of the disclosure. The mobile device used to control the TV application is shown above the TV set. In one embodiment, the confirmation of the activation of the control element 1108 is confirmed via visual feedback to the user 1102 on the GUI 1103 of the hardware device. For example, the confirmation of the activation of the control element 1108 may be displayed back to the user with a highlight, a change in color, a blinking motion, or any other suitable means used to present control element feedback in the GUI 1103. In one embodiment, the confirmation of the activation of the control element 1108 is shown to the user with a growing colored bar over the control element, which enlarges in time over the predetermined period of activation, as illustrated schematically in FIGS. 13 and 14 with a slightly enlarged box corresponding to the actively selected control element, either control element 1106 in FIG. 13 or control element 1108 in FIG. 14. Once the predetermined period of time has elapsed, and the user 1102 has indicated his or her confirmation of the activation of the control element 1108 in the GUI 1103, then the corresponding GUI operation is triggered by the system by a function or subroutine activation, application programming interface (API) call, or the like.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

Conclusions

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

What is claimed is:

1. A non-transitory physical storage medium storing program code, the program code executable by a hardware processor, the hardware processor when executing the program code causing the hardware processor to execute a computer-implemented process for motion tracking on a hardware device without a camera and/or without a sufficiently powerful hardware processor, the process executable on a mobile device with a camera by offloading pose processing to the mobile device, the program code comprising code to:
pair the mobile device with the hardware device over a network connection, the network connection for transmitting pose data from the mobile device to the hardware device;
capture at least one image associated with a user;
perform a pose recognition algorithm on the mobile device, based on the captured image, to generate the pose data for performing a touchless control of an application on the hardware device, wherein the pose recognition algorithm further comprises program code to apply a convolutional neural network to the image to determine a feature map; program code to determine a keypoints map and an affinity-field map based on the feature map; and program code to determine the pose data of the user based on the keypoints map and the affinity-field map; and
transmit the pose data to the hardware device over the network connection.

2. The non-transitory physical storage medium of claim 1, wherein the program code to perform the pose recognition algorithm further comprises program code to:
identify, using an image-recognition technique, an activation gesture of the user in the image;
determine a validity of a bounding box associated with a pose of the user; and
track, using a pose-estimation technique, the pose of the user and a portion of a body of the user within the bounding box, to generate a tracked pose.

3. The non-transitory physical storage medium of claim 1, wherein the pose data is selected from the group consisting of a feature map, a keypoints map, an affinity-field map, and a tracked pose.

4. The non-transitory physical storage medium of claim 1, further comprising program code to:
capture at least one video on the mobile device; and
perform a pose recognition algorithm on the mobile device, based on at least one frame of the captured video, to generate the pose data.

5. The non-transitory physical storage medium of claim 1, wherein the network connection uses a technology selected from the group consisting of a local area network (LAN), a wide area network (WAN), a Bluetooth link, a WiFi network, a sensor network, a cellular network, an ad-hoc wireless network, an enterprise network, and a body area network (BAN).

6. The non-transitory physical storage medium of claim 1, wherein the pose data is used by the application on the hardware device to perform an operation in the application.

7. A non-transitory physical storage medium storing program code, the program code executable by a hardware processor, the hardware processor when executing the program code causing the hardware processor to execute a computer-implemented process for motion tracking, the process executable on a hardware device without a camera and/or without a sufficiently powerful hardware processor by offloading pose processing to a mobile device with a camera, the program code comprising code to:
pair the hardware device with the mobile device over a network connection, the network connection for transmitting pose data from the mobile device to the hardware device;
receive the pose data associated with a user from the mobile device over the network connection, wherein the pose data was derived using a pose recognition algorithm comprising applying a convolutional neural network to an image of the user to determine a feature map; determining a keypoints map and an affinity-field map based on the feature map; and determining the pose data of the user based on the keypoints map and the affinity-field map; and
perform a touchless control of an application on the hardware device, based on the received pose data.

8. The non-transitory physical storage medium of claim 7, wherein the program code to perform the touchless control of the application on the hardware device, based on the received pose data, further comprises program code to:
determine, based on the received pose data, a mapping between the portion of the user's body and a user interface element position associated with an application executed on the hardware device; and
move the user interface element position based on the mapping to enable an interaction between the user and the application.

9. The non-transitory physical storage medium of claim 7, wherein the pose data is selected from the group consisting of a feature map, a keypoints map, an affinity-field map, and a tracked pose.

10. The non-transitory physical storage medium of claim 7, wherein the network connection uses a technology selected from the group consisting of a local area network (LAN), a wide area network (WAN), a Bluetooth link, a WiFi network, a sensor network, a cellular network, an ad-hoc wireless network, an enterprise network, and a body area network (BAN).

11. The non-transitory physical storage medium of claim 7, wherein the pose data is used by the application on the hardware device to perform an operation in the application.

12. A motion tracking system, comprising:
a hardware device without a camera and/or without a sufficiently powerful hardware processor;
a mobile device with a camera; and
a network connection for communicating between the hardware device and the mobile device;
at least one non-transitory physical storage medium storing program code, the program code executable by at least one hardware processor, the at least one hardware processor when executing the program code causing the at least one hardware processor to execute a computer-implemented process for motion tracking on the hardware device, the process executable on the mobile device by offloading pose processing to the mobile device, the program code comprising code to:
pair the mobile device with the hardware device over the network connection;
capture at least one image associated with a user at the mobile device;
perform a pose recognition algorithm on the mobile device, based on the captured image, to generate pose data, wherein the pose recognition algorithm further comprises program code to apply a convolutional neural network to the image to determine a feature map;

program code to determine a keypoints map and an affinity-field map based on the feature map; and program code to determine the pose data of the user based on the keypoints map and the affinity-field map;

transmit the pose data to the hardware device over the network connection; and perform a touchless control of an application on the hardware device, based on the pose data received at the hardware device.

13. The motion tracking system of claim 12, wherein the pose data is selected from the group consisting of a feature map, a keypoints map, an affinity-field map, and a tracked pose.

14. The motion tracking system of claim 12, further comprising program code to:

capture at least one video on the mobile device; and perform a pose recognition algorithm on the mobile device, based on at least one frame of the captured video, to generate the pose data.

* * * * *